(12) United States Patent
Sato

(10) Patent No.: US 10,155,567 B2
(45) Date of Patent: Dec. 18, 2018

(54) BICYCLE SHIFTING CONTROL APPARATUS

(71) Applicant: SHIMANO INC., Sakai (JP)

(72) Inventor: Kota Sato, Sakai (JP)

(73) Assignee: SHIMANO INC., Sakai (JP)

(*) Notice: Subject to any disclaimer, the term of this patent is extended or adjusted under 35 U.S.C. 154(b) by 506 days.

(21) Appl. No.: 14/508,997

(22) Filed: Oct. 7, 2014

(65) Prior Publication Data

US 2016/0096589 A1    Apr. 7, 2016

(51) Int. Cl.
*B62M 25/08* (2006.01)
*B62M 9/122* (2010.01)

(52) U.S. Cl.
CPC ............ *B62M 9/122* (2013.01); *B62M 25/08* (2013.01)

(58) Field of Classification Search
CPC ........ B62M 25/08; B62M 9/122; B62M 6/50; B62M 9/12; B62M 9/121; F16H 61/08; G01P 3/44–3/4956; F16C 41/007; B60B 27/023; B60B 27/047
USPC .......................................................... 474/78
See application file for complete search history.

(56) References Cited

U.S. PATENT DOCUMENTS

| | | | |
|---|---|---|---|
| 6,367,833 B1* | 4/2002 | Horiuchi | B62M 9/122 280/260 |
| 6,676,549 B1 | 1/2004 | Fukuda | |
| 8,327,965 B2* | 12/2012 | Landrieve | B60B 27/02 180/219 |
| 8,336,400 B2* | 12/2012 | Lassanske | B60B 27/0068 73/862.29 |
| 8,360,909 B2* | 1/2013 | Ichida | B62M 25/045 474/69 |
| 8,607,647 B1* | 12/2013 | Wilson | G01L 3/104 73/862.08 |
| 9,284,998 B2* | 3/2016 | Gießibl | F16D 41/24 |
| 2001/0011809 A1* | 8/2001 | Fukuda | B62M 9/122 280/618 |
| 2016/0137259 A1* | 5/2016 | Zhao | B62M 6/50 701/22 |

FOREIGN PATENT DOCUMENTS

| | | |
|---|---|---|
| CN | 102607616 | 7/2012 |
| JP | 2012-145518 | 8/2012 |
| TW | 201325986 | 7/2013 |

* cited by examiner

*Primary Examiner* — Dirk Wright

(74) *Attorney, Agent, or Firm* — Mori & Ward, LLP

(57) ABSTRACT

A bicycle shifting control apparatus comprises a sensing target, a rotational-position sensing unit, and a transmission controller. The sensing target is rotatable with a sprocket assembly. The rotational-position sensing unit is configured to contact the sensing target to sense a rotational position of the sensing target as the rotational position of the sprocket assembly. The transmission controller is configured to control a derailleur based on the rotational position sensed by the rotational-position sensing unit.

18 Claims, 28 Drawing Sheets

| SPROCKET | SHIFT | OPERATING TIME [sec] |
|---|---|---|
| S1 | UP | TU1 |
|  | DOWN | - |
| S2 | UP | TU2 |
|  | DOWN | TD2 |
| S3 | UP | TU3 |
|  | DOWN | TD3 |
| S4 | UP | TU4 |
|  | DOWN | TD4 |
| S5 | UP | TU5 |
|  | DOWN | TD5 |
| S6 | UP | TU6 |
|  | DOWN | TD6 |
| S7 | UP | TU7 |
|  | DOWN | TD7 |
| S8 | UP | TU8 |
|  | DOWN | TD8 |
| S9 | UP | TU9 |
|  | DOWN | TD9 |
| S10 | UP | TU10 |
|  | DOWN | TD10 |
| S11 | UP | - |
|  | DOWN | TD11 |

*FIG. 10*

| SPROCKET | SHIFT | REFERENCE ROTATIONAL POSITION [degree] | | | |
|---|---|---|---|---|---|
| S1 | UP | PU11 | PU12 | PU13 | PU14 |
|  | DOWN | - | - | - | - |
| S2 | UP | PU21 | PU22 | PU23 | PU24 |
|  | DOWN | PD21 | PD22 | PD23 | PD24 |
| S3 | UP | PU31 | PU32 | PU33 | PU34 |
|  | DOWN | PD31 | PD32 | PD33 | PD34 |
| S4 | UP | PU41 | PU42 | PU43 | PU44 |
|  | DOWN | PD41 | PD42 | - | - |
| S5 | UP | PU51 | PU52 | PU53 | PU54 |
|  | DOWN | PD51 | PD52 | - | - |
| S6 | UP | PU61 | PU62 | - | - |
|  | DOWN | PD61 | PD62 | - | - |
| S7 | UP | PU71 | PU72 | - | - |
|  | DOWN | PD71 | PD72 | - | - |
| S8 | UP | PU81 | - | - | - |
|  | DOWN | PD81 | PD82 | - | - |
| S9 | UP | PU91 | - | - | - |
|  | DOWN | PD91 | - | - | - |
| S10 | UP | PU101 | - | - | - |
|  | DOWN | PD101 | - | - | - |
| S11 | UP | - | - | - | - |
|  | DOWN | PD111 | - | - | - |

*FIG. 11*

BICYCLE SHIFTING CONTROL APPARATUS

FIELD OF THE INVENTION

The present invention relates to a bicycle shifting control apparatus.

DISCUSSION OF THE BACKGROUND

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle transmission configured to be electrically operated. Such bicycle transmissions are configured to change a gear position in response to gear shift commands from electric operating devices.

SUMMARY OF THE INVENTION

In accordance with a first aspect of the present invention, a bicycle shifting control apparatus comprises a sensing target, a rotational-position sensing unit, and a transmission controller. The sensing target is rotatable with a sprocket assembly. The rotational-position sensing unit is configured to contact the sensing target to sense a rotational position of the sensing target as the rotational position of the sprocket assembly. The transmission controller is configured to control a derailleur based on the rotational position sensed by the rotational-position sensing unit.

In accordance with a second aspect of the present invention, the bicycle shifting control apparatus according to the first aspect is configured so that the sprocket assembly is configured to be rotatably supported by a housing member configured to be rotatable relative to an axle member. The rotational-position sensing unit and the sensing target are provided outside the housing member.

In accordance with a third aspect of the present invention, the bicycle shifting control apparatus according to the first aspect is configured so that the sensing target comprises an output gear rotatable with the sprocket assembly. The rotational-position sensing unit includes a sensing gear and a sensor. The sensing gear is configured to engage with the output gear. The sensor is configured to sense the rotational position of the sensing target based on a rotational position of the sensing gear.

In accordance with a fourth aspect of the present invention, the bicycle shifting control apparatus according to the first aspect is configured so that the transmission controller is configured to store an operating time for which the derailleur shifts a bicycle chain between a sprocket and an additional sprocket of the sprocket assembly. The additional sprocket is adjacent to the sprocket without another sprocket. The transmission controller is configured to calculate a shift timing at which the derailleur starts to shift the bicycle chain based on the operating time stored in the transmission controller, and a current rotational position sensed by the rotational-position sensing unit when an operation signal to actuate the derailleur is inputted from an operating device to the transmission controller.

In accordance with a fifth aspect of the present invention, the bicycle shifting control apparatus according to the fourth aspect is configured so that the transmission controller is configured to control the derailleur to start to shift the bicycle chain at the shift timing.

In accordance with a sixth aspect of the present invention, a bicycle shifting control apparatus comprises a rotational position sensing unit and a transmission controller. The rotational position sensing unit is configured to sense a rotational position of a sprocket assembly configured to be rotatably supported by a housing member configured to be rotatable relative to an axle member. The rotational position sensing unit is provided inside the housing member. The transmission controller is configured to control a derailleur based on the rotational position sensed by the rotational position sensing unit.

In accordance with a seventh aspect of the present invention, the bicycle shifting control apparatus according to the sixth aspect further comprises a bicycle hub assembly. The bicycle hub assembly includes the axle member and the housing member. The housing member is configured to rotate with the sprocket assembly and is provided radially outward of the axle member. The rotational position sensing unit is provided between the axle member and the housing member.

In accordance with an eighth aspect of the present invention, the bicycle shifting control apparatus according to the seventh aspect further comprises a sensing target rotatable with the sprocket assembly and provided inside the housing member. The rotational position sensing unit is configured to contact the sensing target to sense a rotational position of the sensing target as the rotational position of the sprocket assembly.

In accordance with a ninth aspect of the present invention, the bicycle shifting control apparatus according to the eighth aspect is configured so that the sensing target comprises an output gear rotatable with the sprocket assembly. The rotational-position sensing unit includes a sensing gear and a sensor. The sensing gear is configured to mesh with the output gear. The sensor is configured to sense the rotational position of the sensing target based on a rotational position of the sensing gear.

In accordance with a tenth aspect of the present invention, the bicycle shifting control apparatus according to the sixth aspect further comprises a sensing target rotatable with the sprocket assembly and provided inside the bicycle hub assembly. The rotational position sensing unit is configured to sense a rotational position of the sensing target as the rotational position of the sprocket assembly without contacting the sensing target.

In accordance with an eleventh aspect of the present invention, the bicycle shifting control apparatus according to the tenth aspect further comprises a bicycle hub assembly. The bicycle hub assembly includes the axle member and the housing member. The housing member is configured to rotate with the sprocket assembly and is provided radially outward of the axle member. The sensing target is mounted on an inner periphery of the housing member. The rotational-position sensing unit is mounted on an outer periphery of the axle member to face the sensing target.

In accordance with a twelfth aspect of the present invention, the bicycle shifting control apparatus according to the sixth aspect is configured so that the transmission controller is configured to store an operating time for which the derailleur shifts a bicycle chain between a sprocket and an additional sprocket of the sprocket assembly. The addition sprocket is adjacent to the sprocket without another sprocket. The transmission controller is configured to calculate a shift timing at which the derailleur starts to shift the bicycle chain based on the operating time stored in the transmission controller, and a current rotational position sensed by the rotational-position sensing unit when an operation signal to actuate the derailleur is inputted from an operating device to the transmission controller.

In accordance with a thirteenth aspect of the present invention, the bicycle shifting control apparatus according to the twelfth aspect is configured so that the transmission controller is configured to control the derailleur to start to shift the bicycle chain at the shift timing.

In accordance with a fourteenth aspect of the present invention, a bicycle shifting control apparatus comprises a sensing target, a rotational position sensing unit, and a transmission controller. The sensing target is rotatable with a sprocket assembly. The rotational position sensing unit is configured to sense a rotational position of the sprocket assembly and includes an imaging sensor configured to capture a target image of the sensing target. The transmission controller is configured to calculate a rotational position of the sprocket assembly based on the target image captured by the imaging sensor and is configured to control a derailleur based on the rotational position calculated by the transmission controller.

In accordance with a fifteenth aspect of the present invention, the bicycle shifting control apparatus according to the fourteenth aspect is configured so that the sprocket assembly is configured to be rotatably supported by a housing member configured to be rotatable relative to an axle member.

In accordance with a sixteenth aspect of the present invention, the bicycle shifting control apparatus according to the fourteenth aspect is configured so that the sensing target comprises a reference pattern indicating an absolute rotational position of the sprocket assembly. The imaging sensor is configured to capture a pattern image of the reference pattern as the target image. The transmission controller is configured to calculate the absolute rotational position of the sprocket assembly based on the pattern image captured by the imaging sensor. The transmission controller is configured to control the derailleur based on the absolute rotational position calculated by the transmission controller.

In accordance with a seventeenth aspect of the present invention, the bicycle shifting control apparatus according to the fourteenth aspect is configured so that the transmission controller is configured to store an operating time for which the derailleur shifts a bicycle chain between a sprocket and an additional sprocket of the sprocket assembly, the additional sprocket being adjacent to the sprocket without another sprocket. The transmission controller is configured to calculate a timing at which the derailleur starts to shift the bicycle chain based on the operating time stored in the transmission controller, and a current rotational position sensed by the rotational-position sensing unit when an operation signal to actuate the derailleur is inputted from an operating device to the transmission controller.

In accordance with an eighteenth aspect of the present invention, the bicycle shifting control apparatus according to the seventeenth aspect is configured so that the transmission controller is configured to control the derailleur to start to shift the bicycle chain at the timing calculated by the transmission controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 shows an example of a list of operating times for the sprocket assembly illustrated in FIG. 2;

FIG. 11 shows an example of a list of reference rotational positions for the sprocket assembly illustrated in FIG. 2;

DESCRIPTION OF THE EMBODIMENTS

Figure 1:
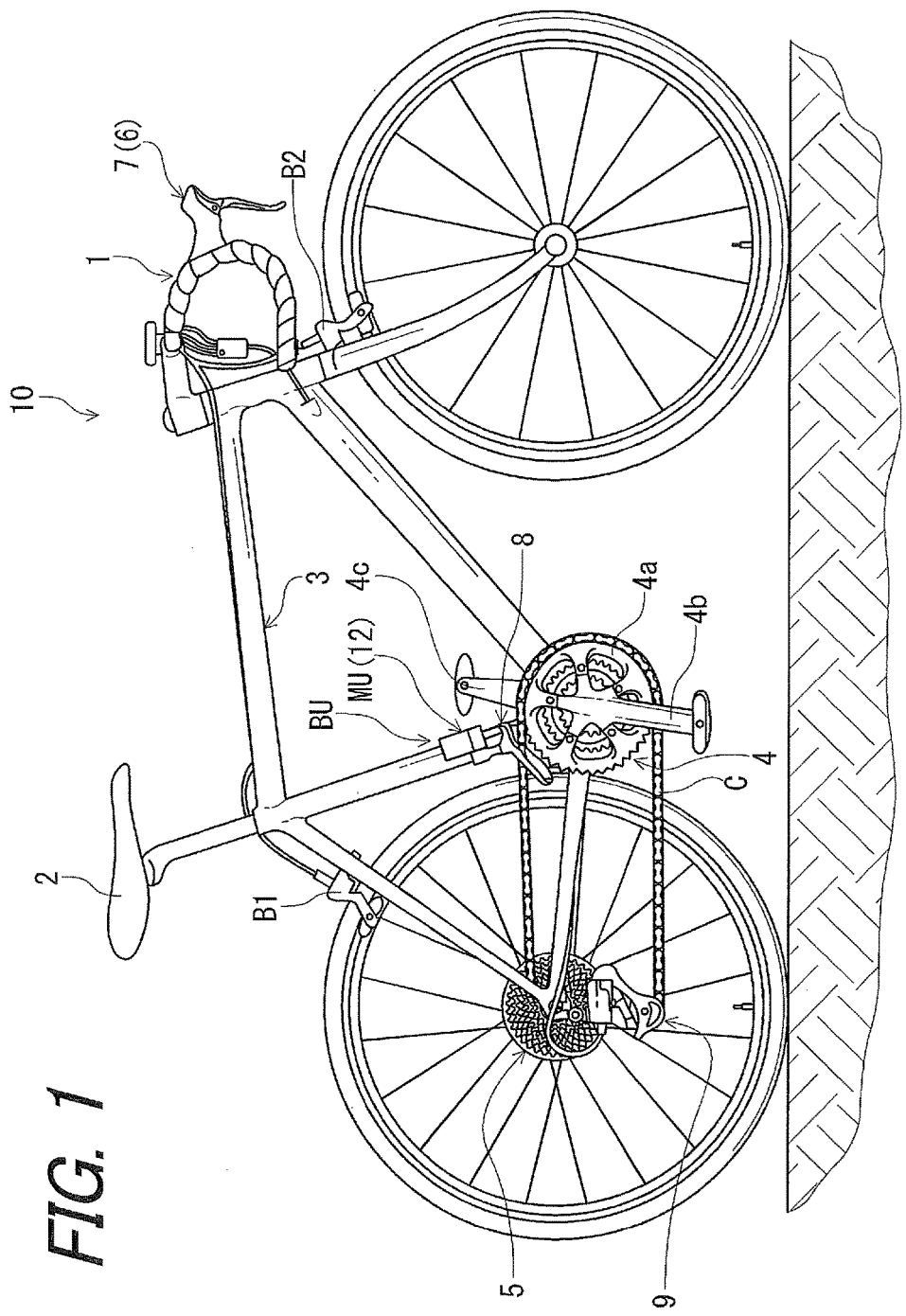
FIG. 1 is a side elevational view of a bicycle provided with a bicycle shifting control apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle shifting control apparatus 12 in accordance with a first embodiment. While the bicycle 10 is illustrated as a road bike, the bicycle shifting control apparatus 12 can be applied to mountain bikes or any type of bicycle.

As seen in FIG. 1, the bicycle 10 includes a handlebar 1, a saddle 2, a bicycle frame 3, a crank assembly 4, a rear sprocket assembly 5, a front operating device 6, a rear operating device 7, an electric (motorized) front derailleur 8, and an electric (motorized) rear derailleur 9. A bicycle chain C engages with a chain wheel 4a of the crank assembly 4 and the rear sprocket assembly 5. The electric front derailleur 8 is configured to shift the bicycle chain C between a plurality of front gear positions in response to operation of the front operating device 6. The electric rear derailleur 9 is configured to shift the bicycle chain C between a plurality of rear gear positions in response to operation of the rear operating device 7. The front operating device 6 is integrated in a left-side operating device via which a user operates a rear braking device B1. The rear operating device 7 is integrated in a right-side operating device via which a user operates a front braking device B2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle 2 of a bicycle with facing the handlebar 1. Accordingly, these terms, as utilized to describe bicycle components, should be interpreted relative to the bicycle 10 equipped with the bicycle components as used in an upright riding position on a horizontal surface.

The bicycle 10 includes a battery unit BU and a master unit MU. The battery unit BU and the master unit MU are mounted on the bicycle frame 3. The battery unit BU is configured to supply electrical power to several electric components such as the master unit MU, the electric front derailleur 8, and the electric rear derailleur 9. The master unit MU is configured to control several electric components. In the illustrated embodiment, electric components of the bicycle shifting control apparatus 12 are at least partially mounted in the master unit MU. However, the electric components of the bicycle shifting control apparatus 12 can be at least partially mounted in other electric components such as the front operating device 6, the rear operating device 7, the electric front derailleur 8, and the electric rear derailleur 9 if needed and/or desired. For example, the electric components of the bicycle shifting control apparatus 12 can be at least partially mounted in the rear derailleur 9.

In the illustrated embodiment, the bicycle shifting control apparatus 12 will be described below in detail using the rear sprocket assembly 5, the rear operating device 7, and the electric rear derailleur 9. The rear sprocket assembly 5 can be hereinafter referred to as a sprocket assembly 5. The rear operating device 7 can be hereinafter referred to as an operating device 7. The electric rear derailleur 9 can be hereinafter referred to as a derailleur 9.

Figure 2:
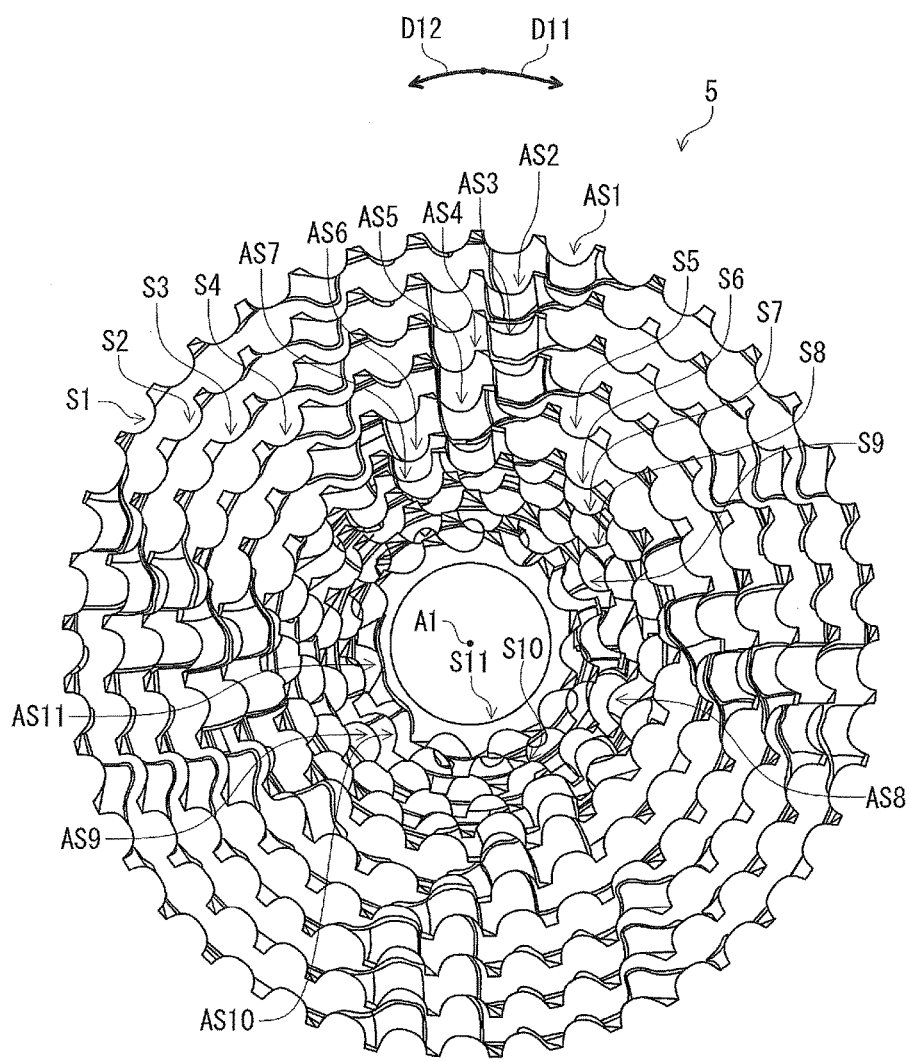
FIG. 2 is a side elevational view of a sprocket assembly of the bicycle illustrated in FIG. 1.

As seen in FIG. 2, the sprocket assembly 5 has a rotational center axis A1 and is rotatable about the rotational center axis A1 in a rotational driving direction D11 during pedaling. The sprocket assembly 5 includes sprockets S1 to S11. The sprocket S1 has a largest outer diameter in the sprocket assembly 5. The sprocket S11 has a smallest outer diameter in the sprocket assembly 5.

Figure 3:
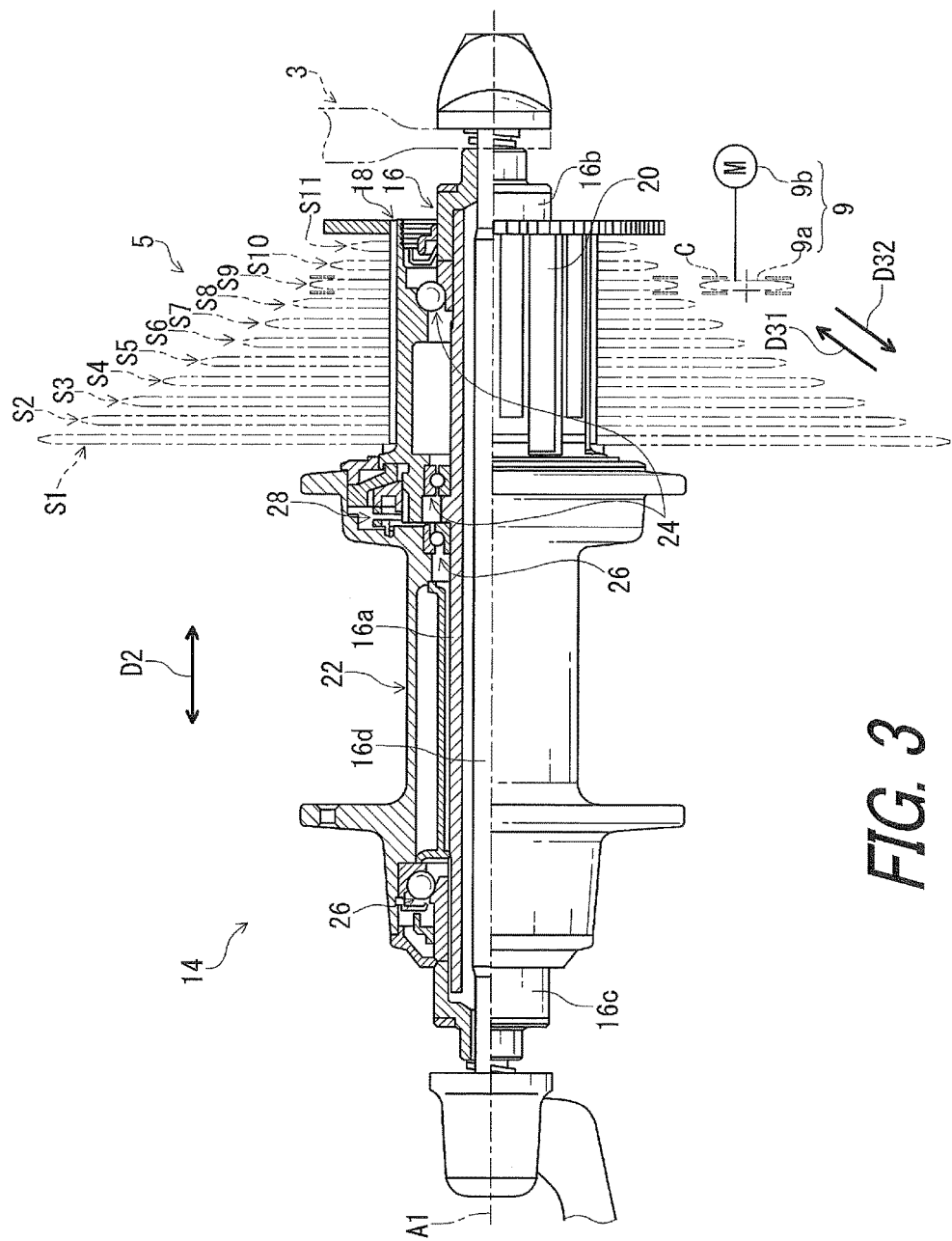
FIG. 3 is a half cross-sectional view of a bicycle hub assembly of the bicycle illustrated in FIG. 1.

As seen in FIG. 3, the sprockets S1 to S11 are arranged in an axial direction D2 parallel to the rotational center axis A1. The bicycle shifting control apparatus 12 comprises a bicycle hub assembly 14. The sprockets S1 to S11 are mounted on the bicycle hub assembly 14.

The bicycle hub assembly 14 includes an axle member 16 and a housing member 18. In the illustrated embodiment, the bicycle shifting control apparatus 12 is applied to the rear sprocket assembly 5 and the derailleur 9. Accordingly, the housing member 18 is a sprocket support body of the bicycle hub assembly 14, and the axle member 16 is a hub axle of the bicycle hub assembly 14. When the bicycle shifting control apparatus 12 is applied to the front derailleur 8, however, the housing member 18 can be a bottom bracket shell of the bicycle frame 3 (FIG. 1), and the axle member 16 can be a crank axle of the crank assembly 4 (FIG. 1), for example.

As seen in FIG. 3, the axle member 16 is configured to be mounted to the bicycle frame 3 and extends in the axial direction D2. The housing member 18 is configured to rotate with the sprocket assembly 5 and is provided radially outward of the axle member 16. The sprocket assembly 5 is configured to be rotatably supported by the housing member 18 configured to be rotatable relative to the axle member 16. In the illustrated embodiment, the housing member 18 has a cylindrical shape extending in the axial direction D2. The housing member 18 includes an outer splined part 20 configured to engage with an inner splined portion of the sprocket assembly 5.

The axle member 16 includes a tubular part 16a, a first end cap 16b, a second end cap 16c, and a mounting rod 16d. The tubular part 16a extends in the axial direction D2. The first end cap 16b is secured to a first end of the tubular part 16a. The second end cap 16c is secured to a second end of the tubular part 16a. The mounting rod 16d extends through the tubular part 16a, the first end cap 16b and the second end cap 16c in the axial direction D2. The mounting rod 16d is configured to be mounted to the bicycle frame 3. The tubular part 16a, the first end cap 16b and the second end cap 16c are supported by the mounting rod 16d.

The bicycle hub assembly 14 further includes a hub shell 22, first bearing assemblies 24, second bearing assemblies 26, and a ratchet structure 28. The hub shell 22 is configured to be rotatably mounted on the axle member 16 about the rotational center axis A1. A rim (not shown) is connected to the hub shell 22 via spokes (not shown). The first bearing assemblies 24 are configured to rotatably support the housing member 18 on the axle member 16. The second bearing assemblies 26 are configured to rotatably support the hub shell 22 on the axle member 16. One of the first bearing assemblies 24 is mounted on the first end cap 16b of the axle member 16. The other of the first bearing assemblies 24 is mounted on the tubular part 16a of the axle member 16. One of the second bearing assemblies 26 is mounted on the second end cap 16c of the axle member 16. The other of the second bearing assemblies 26 is mounted on the tubular part 16a of the axle member 16.

As seen in FIG. 3, the ratchet structure 28 serves as a one-way clutch to transmit a driving force from the housing member 18 to the hub shell 22. More specifically, the ratchet structure 28 is configured to prevent the housing member 18 from rotating relative to the hub shell 22 in the rotational driving direction D11 (FIG. 2). The ratchet structure 28 is further configured to allow the housing member 18 to rotate relative to the hub shell 22 in a reverse direction D12 (FIG. 2) opposite to the rotational driving direction D11.

The sprocket assembly 5, the housing member 18, and the hub shell 22 are configured to integrally rotate relative to the axle member 16 in the rotational driving direction D11 (FIG. 2) during pedaling. The sprocket assembly 5 and the housing member 18 are configured to relatively rotate in the reverse direction D12 (FIG. 2) with respect to the axle member 16 and the hub shell 22 not to transmit force from the hub shell 22 to the sprocket assembly 5 during coasting. Since the bicycle hub assembly 14 includes structures known in the bicycle field, they will not be described and/or illustrated in detail here for the sake of brevity.

As seen in FIG. 3, the derailleur 9 includes a chain guide 9a and a guide actuator 9b. The chain guide 9a is configured to engage with the bicycle chain C to shift the bicycle chain C between the sprockets S1 to S11. The guide actuator 9b is configured to move the chain guide 9a relative to the bicycle hub assembly 14. Since the derailleur 9 includes structures known in the bicycle field, they will not be described and/or illustrated in detail here for the sake of brevity.

Upshifting occurs when the bicycle chain C is shifted by the derailleur 9 from a larger sprocket to a neighboring smaller sprocket in an upshifting direction D31. Downshifting occurs when the bicycle chain C is shifted by the derailleur 9 from a small sprocket to a neighboring larger sprocket in a downshifting direction D32.

As seen in FIG. 2, the sprockets S1 to S11 have a shift assist structure configured to assist a shifting motion of the bicycle chain C. In the illustrated embodiment, the sprockets S1 to S11 have the shift assist structures AS1 to AS11, respectively.

Figure 4:
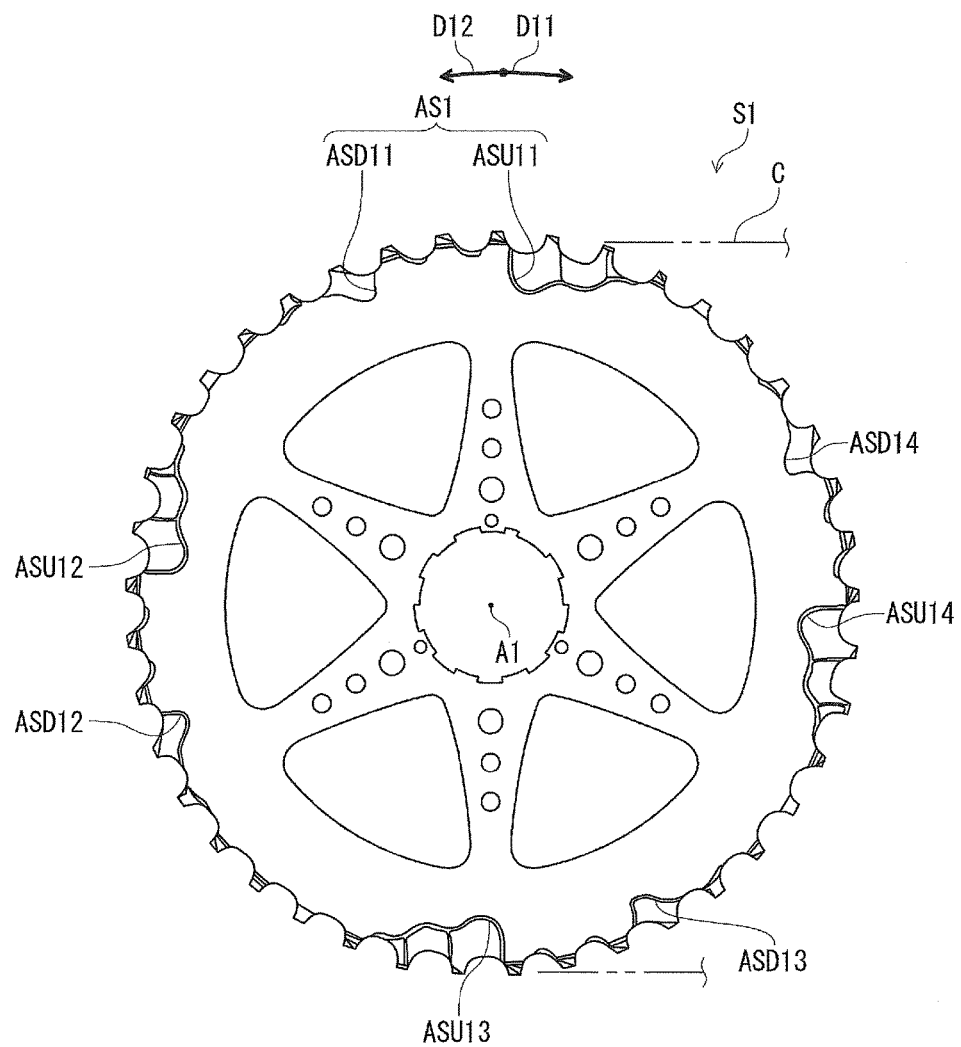
FIG. 4 is a side elevational view of a sprocket of the sprocket assembly illustrated in FIG. 2.

As seen in FIG. 4, the shift assist structure AS1 of the sprocket S1 includes at least one shift assist recess. In the illustrated embodiment, the shift assist structure AS1 includes upshift assist recesses ASU1 to ASU14 and downshift assist recesses ASD11 to ASD14 as the at least one shift assist recess. The upshift assist recesses ASU11 to ASU14 are configured to assist an upshifting motion of the bicycle chain C. The downshift assist recesses ASD11 to ASD14 are configured to assist a downshifting motion of the bicycle chain C. More specifically, the upshift assist recesses ASU11 to ASU14 are configured to reduce interference between the sprocket S1 and the bicycle chain C in the upshifting motion of the bicycle chain C. The downshift assist recesses ASD11 to ASD14 are configured to reduce interference between the sprocket S1 and the bicycle chain C in the downshifting motion of the bicycle chain C.

Figure 5:
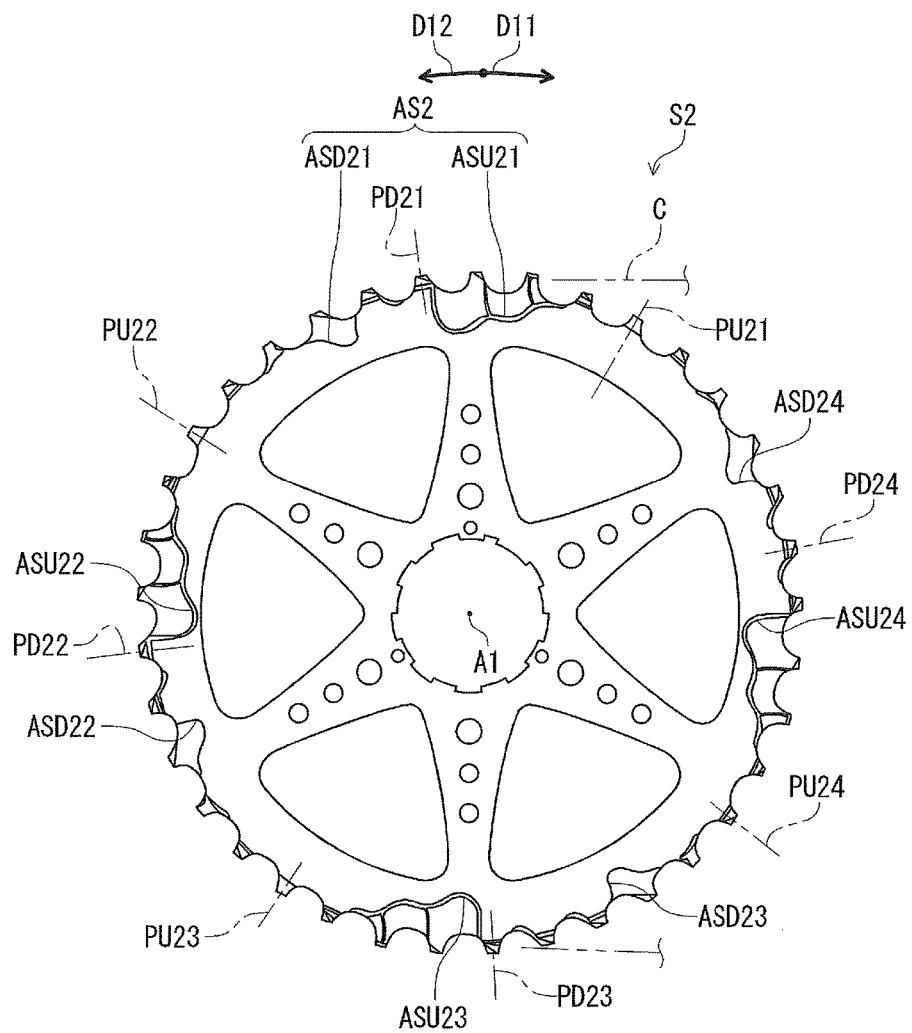
FIG. 5 is a side elevational view of a sprocket of the sprocket assembly illustrated in FIG. 2.

As seen in FIG. 5, the shift assist structure AS2 of the sprocket S2 includes at least one shift assist recess. In the illustrated embodiment, the shift assist structure AS2 includes upshift assist recesses ASU21 to ASU24 and downshift assist recesses ASD21 to ASD24 as the at least one shift assist recess. The upshift assist recesses ASU21 to ASU24 are configured to assist an upshifting motion of the bicycle chain C. The downshift assist recesses ASD21 to ASD24 are configured to assist a downshifting motion of the bicycle chain C. More specifically, the upshift assist recesses ASU21 to ASU24 are configured to reduce interference between the sprocket S2 and the bicycle chain C in the upshifting motion of the bicycle chain C. The downshift assist recesses ASD21 to ASD24 are configured to reduce interference between the sprocket S2 and the bicycle chain C in the downshifting motion of the bicycle chain C.

Figure 6:
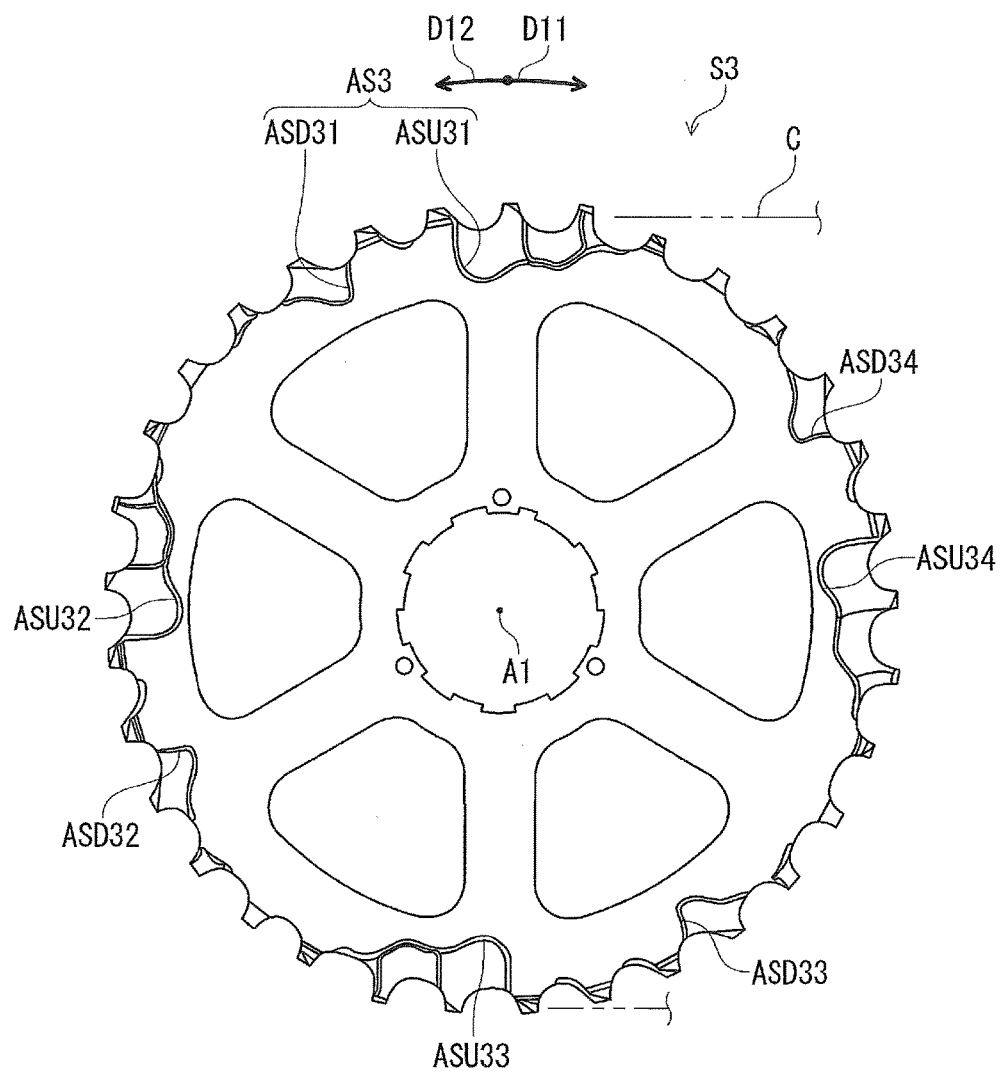
FIG. 6 is a side elevational view of a sprocket of the sprocket assembly illustrated in FIG. 2.

As seen in FIG. 6, the shift assist structure AS3 of the sprocket S3 includes at least one shift assist recess. In the illustrated embodiment, the shift assist structure AS3 includes upshift assist recesses ASU31 to ASU34 and downshift assist recesses ASD31 to ASD34 as the at least one shift assist recess. The upshift assist recesses ASU31 to ASU34 are configured to assist an upshifting motion of the bicycle chain C. The downshift assist recesses ASD31 to ASD34 are configured to assist a downshifting motion of the bicycle chain C. More specifically, the upshift assist recesses ASU31 to ASU34 are configured to reduce interference between the sprocket S3 and the bicycle chain C in the upshifting motion of the bicycle chain C. The downshift assist recesses ASD31 to ASD34 are configured to reduce interference between the sprocket S3 and the bicycle chain C in the downshifting motion of the bicycle chain C.

Each of the shift assist structures AS1 to AS3 can include at least one shift assist tooth and/or at least one shift assist gap instead of or in addition to the at least one shift assist recess. The shift assist gap is free from an additional tooth configured to engage with the bicycle chain C.

As well as the shift assist structures AS1 to AS3 of the sprockets S1 to S3, each of the shift assist structures AS4 to AS11 (FIG. 2) includes at least one shift assist recess. Since they have substantially the same structure as the shift assist structures AS1 to AS3, they will not be described and/or illustrated in detail here for the sake of brevity.

Figure 7:
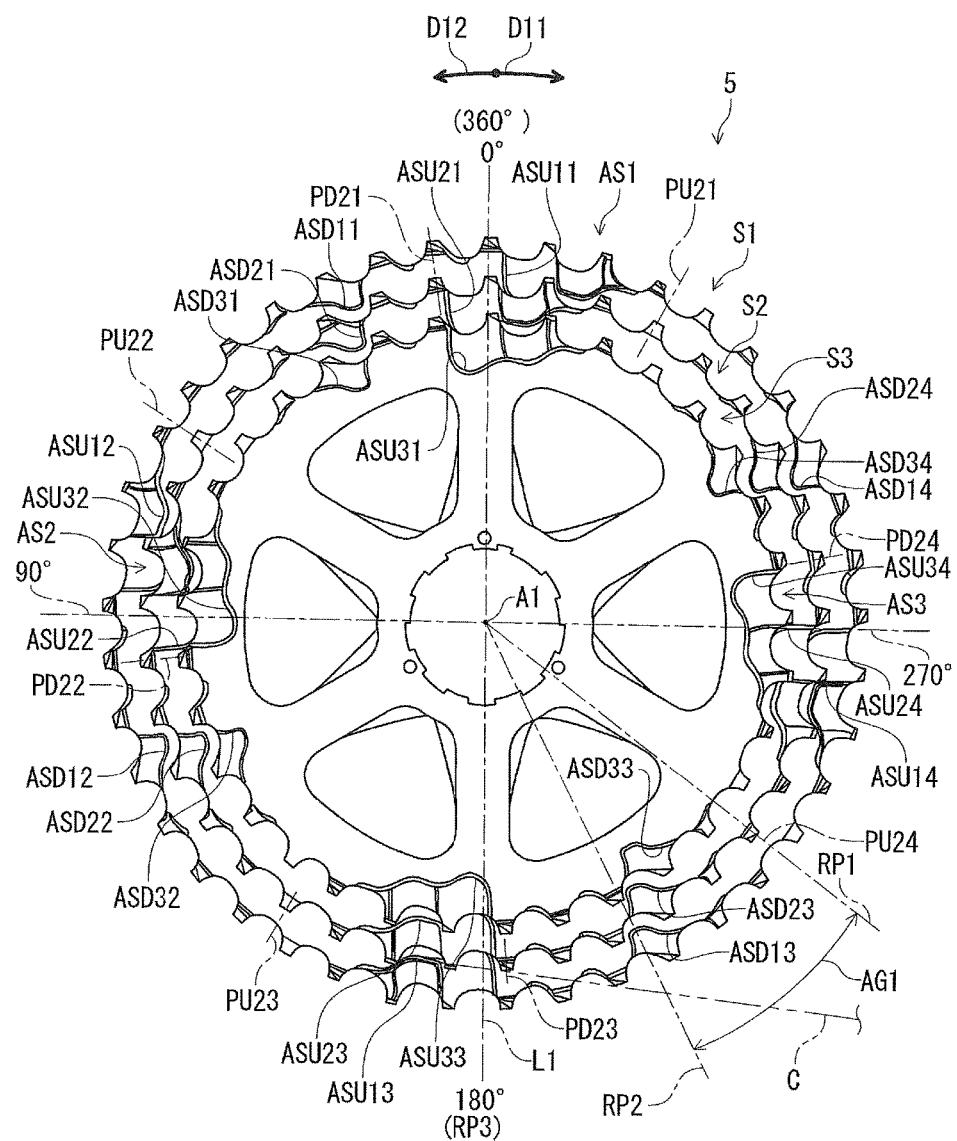
FIG. 7 is a side elevational view of the sprockets of the sprocket assembly illustrated in FIG. 2.

In FIG. 7, the sprockets S4 to S11 are omitted from the sprocket assembly 5 for the purpose of illustration. Each of the upshift assist recesses ASU21 to ASD24 has a preferable upshift timing (a preferable rotational position) at which the derailleur 9 shifts the bicycle chain C from the sprocket S2 to the sprocket S3. Similarly, each of the downshift assist recesses ASD11 to ASD14 has a preferable downshift timing (a preferable rotational position) at which the derailleur 9 shifts the bicycle chain C from the sprocket S2 to the sprocket S1. The preferable upshift timing at which the derailleur 9 shifts the bicycle chain C from the sprocket S2 to the sprocket S3 is defined based on the upshift assist recesses ASU21 to ASU24 of the sprocket S2. The preferable downshift timing at which the derailleur 9 shifts the bicycle chain C from the sprocket S2 to the sprocket S1 is defined based on the downshift assist recesses ASD11 to ASD14 of the sprocket S1.

Shifting the bicycle chain C at the preferable upshift timing reduces shock caused by interference between the bicycle chain C and the sprocket S2 during upshifting. Shifting the bicycle chain C at the preferable downshift timing reduces shock caused by interference between the bicycle chain C and the sprocket S1 during downshifting.

To reduce such shock during upshifting and/or downshifting, the bicycle shifting control apparatus 12 is configured to adjust a timing at which the derailleur 9 shifts the bicycle chain C based on a rotational position of the sprocket assembly 5. In the present application, the rotational position of the sprocket assembly 5 can be described as an angle in the rotational driving direction D11.

Figure 8:
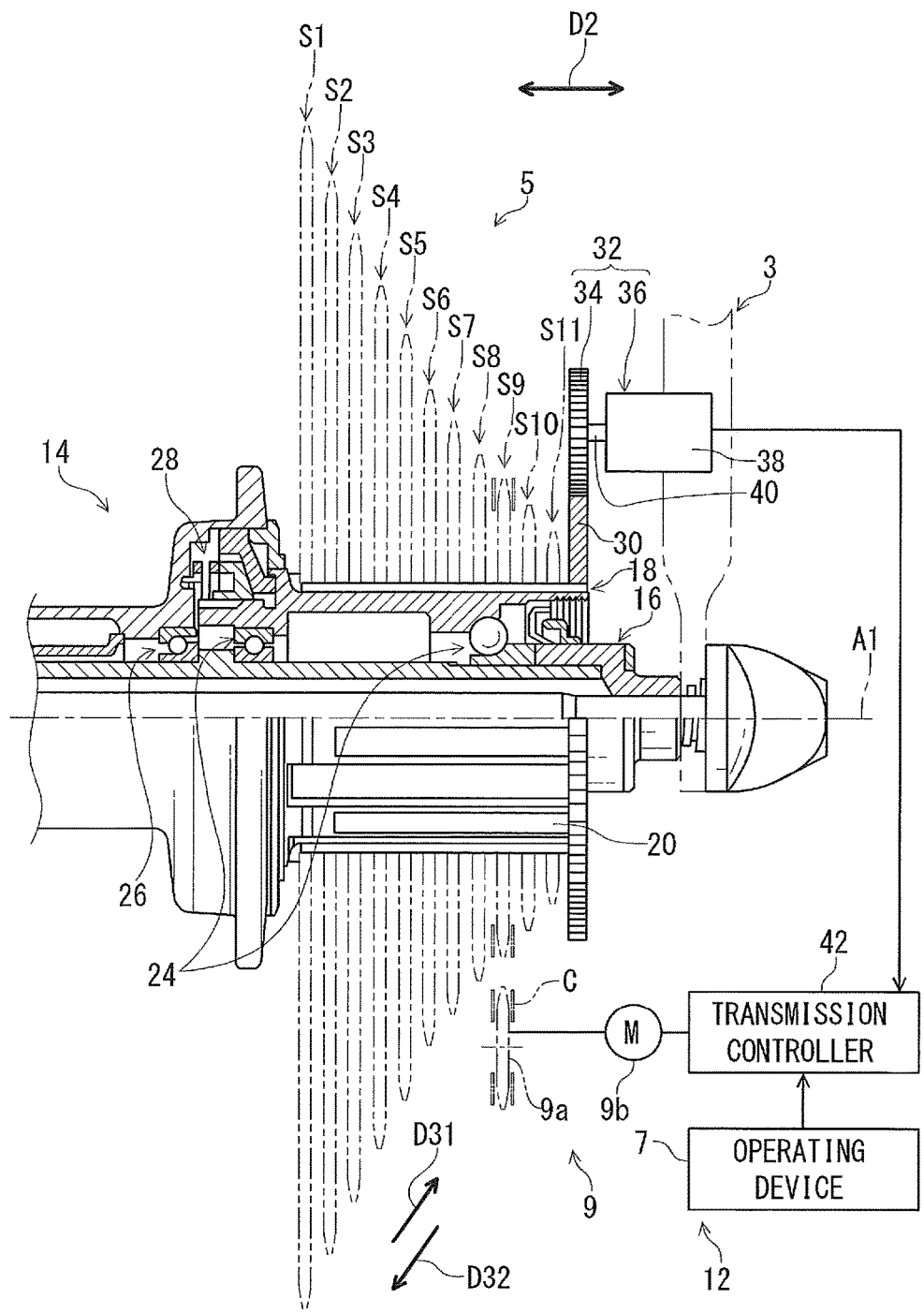
FIG. 8 is a partial half cross-sectional view of the bicycle hub assembly illustrated in FIG. 3.

As seen in FIG. 8, the bicycle shifting control apparatus 12 comprises a sensing target 30 and a rotational-position sensing unit 32. The sensing target 30 is rotatable with the sprocket assembly 5. In the illustrated embodiment, the sensing target 30 comprises an output gear rotatable with the sprocket assembly 5.

The rotational-position sensing unit 32 is configured to contact the sensing target 30 to sense a rotational position of the sensing target 30 as the rotational position of the sprocket assembly 5. In the illustrated embodiment, the rotational-position sensing unit 32 includes a sensing gear 34 and a sensor 36. The sensing gear 34 is configured to engage with the output gear. The sensor 36 is configured to sense the rotational position of the sensing target 30 based on a rotational position of the sensing gear 34. Possible examples of the sensor 36 include a contact rotational position sensor such as a potentiometer, and a non-contact rotational position sensor such as an optical sensor and a magnetic sensor. Possible examples of the optical sensor include a rotary encoder. Possible examples of the magnetic sensor include a sensor having a magnetic resistance element, and a hall sensor having a hall element.

In the illustrated embodiment, the rotational-position sensing unit 32 and the sensing target 30 are provided outside the housing member 18. The rotational-position sensing unit 32 is attached to the bicycle frame 3. The sensing target 30 is provided radially outward of the housing member 18. The sensing target 30 includes an inner splined part configured to engage with the outer splined part 20 of the housing member 18, for example.

As seen in FIG. 8, the sensing target 30 has an outer diameter larger than an outer diameter of the sprocket S11. The sensing gear 34 is disposed radially outward of the sensing target 30 and is configured to mesh with the sensing target 30. The sensing gear 34 is provided at an axial position substantially equal to an axial position of the sensing target 30.

While the sensing target 30 is disposed on an axially outer side of the sprocket assembly 5 in the axial direction D2, the sensing target 30 can be provided at other positions if needed and/or desired. For example, the sensing target 30 can be disposed on an axially inner side relative to the sprocket assembly 5 in the axial direction D2. The sensing target 30 can be attached to the sprocket assembly 5 or can be the sprocket assembly 5 itself.

As seen in FIG. 8, the sensor 36 includes a sensor housing 38 and a rotation shaft 40. The sensor housing 38 is attached the bicycle frame 3. The rotation shaft 40 is rotatable relative to the sensor housing 38. The sensing gear 34 is secured to an end of the rotation shaft 40. In a case where the sensor 36 is a potentiometer, the sensor 36 further includes a resistive element (not shown) and a sliding contact (not shown) which are provided in the sensor housing 38. The sensor 36 is configured to periodically sense an absolute rotational position of the sensing gear 34 and is configured to periodically generate signals indicating the absolute rotational position of the sensing gear 34 as a current rotational position of the sprocket assembly 5.

Figure 9:
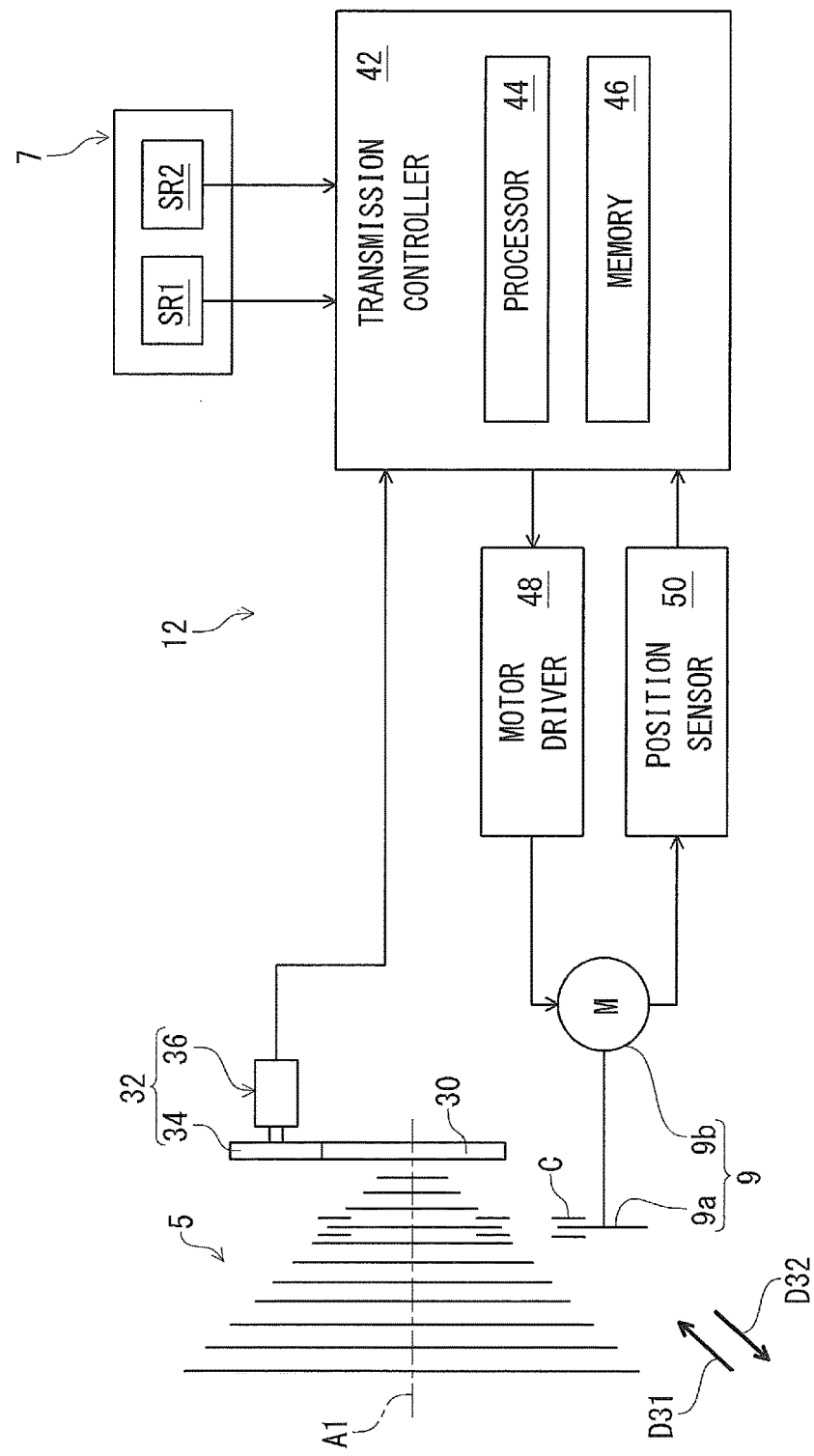
FIG. 9 is a schematic block diagram of the bicycle shifting control apparatus illustrated in FIG. 1.

As seen in FIG. 9, the bicycle shifting control apparatus 12 comprises a transmission controller 42. The transmission controller 42 is configured to control the derailleur 9 based on the rotational position sensed by the rotational-position sensing unit 32. In the illustrated embodiment, the transmission controller 42 is constituted as a microcomputer and includes a processor 44 and a memory 46. The processor 44 includes a central processing unit (CPU). The memory 46 includes a read only memory (ROM) and a random access memory (RAM). For example, a program stored in the memory 46 is read into the processor 44, and thereby several functions of the transmission controller 42 are performed.

While the functions of the transmission controller 42 are performed by software, the functions of the transmission controller 42 can be at least partially performed by hardware or a combination of the software and the hardware.

The transmission controller 42 is configured to store, in the memory 46, the current rotational position of the sprocket assembly 5 sensed by the rotational-position sensing unit 32. The transmission controller 42 is configured to periodically update the current rotational position stored in the memory 46 based on the current rotational position sensed by the rotational-position sensing unit 32.

As seen in FIG. 9, the bicycle shifting control apparatus 12 comprises a motor driver 48 and a position sensor 50. The motor driver 48 and the position sensor 50 can be provided in the derailleur 9. The motor driver 48 is configured to control the guide actuator 9b based on commands and/or signals from the transmission controller 42. Possible examples of the guide actuator 9b include a direct-current (DC) motor and a stepper motor.

The position sensor 50 is configured to sense a current shift position of the derailleur 9. More specifically, the position sensor 50 is configured to sense a current axial position of the chain guide 9a relative to the sprocket assembly 5. Possible examples of the position sensor 50 include a contact rotational position sensor such as a potentiometer, and a non-contact rotational position sensor such as an optical sensor and a magnetic sensor. Possible examples of the optical sensor include a rotary encoder. Possible examples of the magnetic sensor include a sensor having a magnetic resistance element, and a hall sensor having a hall element.

The guide actuator 9b, the motor driver 48 and the position sensor 50 constitute a servomotor. The transmission controller 42 is configured to determine the current shift position of the derailleur 9 based on the current axial position sensed by the position sensor 50. The transmission controller 42 is configured to store the current axial position of the chain guide 9a as the current shift position in the memory 46.

As seen in FIG. 9, the operating device 7 includes a first operating member SR1 and a second operating member SR2. The first operating member SR1 is configured to be operated by a user for upshifting. The second operating member SR2 is configured to be operated by the user for the downshifting. An upshifting operation signal is inputted from the operating device 7 to the transmission controller 42 when the first operating member SR1 is operated. A downshifting operation signal is inputted from the operating device 7 to the transmission controller 42 when the second operating member SR2 is operated.

The transmission controller 42 is configured to calculate a current rotational speed of the sprocket assembly 5 based on the rotational positions sensed by the rotational-position sensing unit 32. More specifically, the transmission controller 42 is configured to periodically calculate the current rotational speed of the sprocket assembly 5 based on a rotation angle of the sprocket assembly 5 per unit time. The transmission controller 42 is configured to store the current rotational speed in the memory 46. The transmission controller 42 is configured to periodically update the current rotational speed stored in the memory 46. Other rotational speed sensors can be used instead of the rotational-position sensing unit 32 if needed and/or desired.

As seen in FIG. 9, the transmission controller 42 is configured to store an operating time for which the derailleur 9 shifts the bicycle chain C between a sprocket and an additional sprocket of the sprocket assembly 5. The additional sprocket is adjacent to the sprocket without another sprocket. For example, the transmission controller 42 is configured to store the operating time for which the derailleur 9 shifts the bicycle chain C between adjacent two sprockets among the sprockets S1 to S11 (FIG. 4). More specifically, the transmission controller 42 is configured to store the operating times for which the derailleur 9 shifts the chain guide 9a between adjacent two shift positions among shift positions which respectively correspond to the sprockets S1 to S11.

FIG. 10 shows an example of a list of the operating time. As seen in FIG. 10, the transmission controller 42 (FIG. 9) is configured to store the operating times TU1 to TD11 in the memory 46 (FIG. 9). Namely, the transmission controller 42 serves as an operating time memory configured to store an operating time for which the derailleur 9 shifts the bicycle chain C between a sprocket and an additional sprocket of the sprocket assembly 5.

For example, the operating time TU2 is a period of time for which the derailleur 9 shifts the chain guide 9a from a shift position corresponding to the sprocket S2 (FIG. 8) to a shift position corresponding to the sprocket S3 (FIG. 8) during upshifting. The operating time TD2 is a period of time for which the derailleur 9 shifts the chain guide 9a from the shift position corresponding to the sprocket S2 to a shift position corresponding to the sprocket S1 during downshifting.

As seen in FIG. 9, the transmission controller 42 is configured to calculate a shift timing at which the derailleur 9 starts to shift the bicycle chain C based on the operating time and the current rotational position. The current rotational position is sensed by the rotational-position sensing unit 32 when an operation signal to actuate the derailleur 9 is inputted from the operating device 7 to the transmission controller 42. The transmission controller 42 is configured to store the current rotational position sensed by the rotational-position sensing unit 32 when the upshifting operation signal to actuate the derailleur 9 is inputted from the operating device 7 to the transmission controller 42. Furthermore, the transmission controller 42 is configured to store the current rotational position sensed by the rotational-position sensing unit 32 when the downshifting operation signal to actuate the derailleur 9 is inputted from the operating device 7 to the transmission controller 42.

The transmission controller 42 is configured to control the derailleur 9 to start to shift the bicycle chain C at the shift timing. In the illustrated embodiment, the transmission controller 42 is configured to store the current rotational position. The transmission controller 42 serves as a timing calculator configured to calculate a shift timing at which the derailleur 9 starts to shift the bicycle chain C based on the operating time and the current rotational position.

FIG. 11 shows an example of a list of the reference rotational positions. As seen in FIG. 11, the transmission controller 42 is configured to store a reference rotational position where the derailleur 9 completes shifting the chain guide 9a from a current shift position to a target shift position adjacent to the current shift position. In the illustrated embodiment, the transmission controller 42 is configured to store at least one reference rotational position for each of the sprockets S1 to S11.

As seen in FIG. 7, the sprocket S2 has reference rotational positions PU21 to PU24 for the upshift assist recesses ASU21 to ASU24, respectively. The sprocket S2 has reference rotational positions PD21 to PD24 for the downshift assist recesses ASD11 to ASD14 of the sprocket S1, respectively. The reference rotational positions PU21 to PU24 are defined based on the positions of the upshift assist recesses ASU21 to ASU24 of the sprocket S2. The reference rotational positions PD21 to PD24 are defined based on the positions of the downshift assist recesses ASD11 to ASD14 of the sprocket S1.

The rotational position is defined on the sprocket assembly 5 about the rotational center axis A1 from 0 to 360 degrees. A positive direction of the rotational position coincides with the reverse direction D12 opposite to the rotational driving direction D11. The current rotational position can be sensed by the rotational-position sensing unit 32 (FIG. 9) based on the reference line L1 extending radially outwardly from the rotational center axis A1 to a lower side of the sprocket assembly 5. For example, the rotational position of the sprocket assembly 5 shown in FIG. 7 is 180 degrees.

Figure 12:
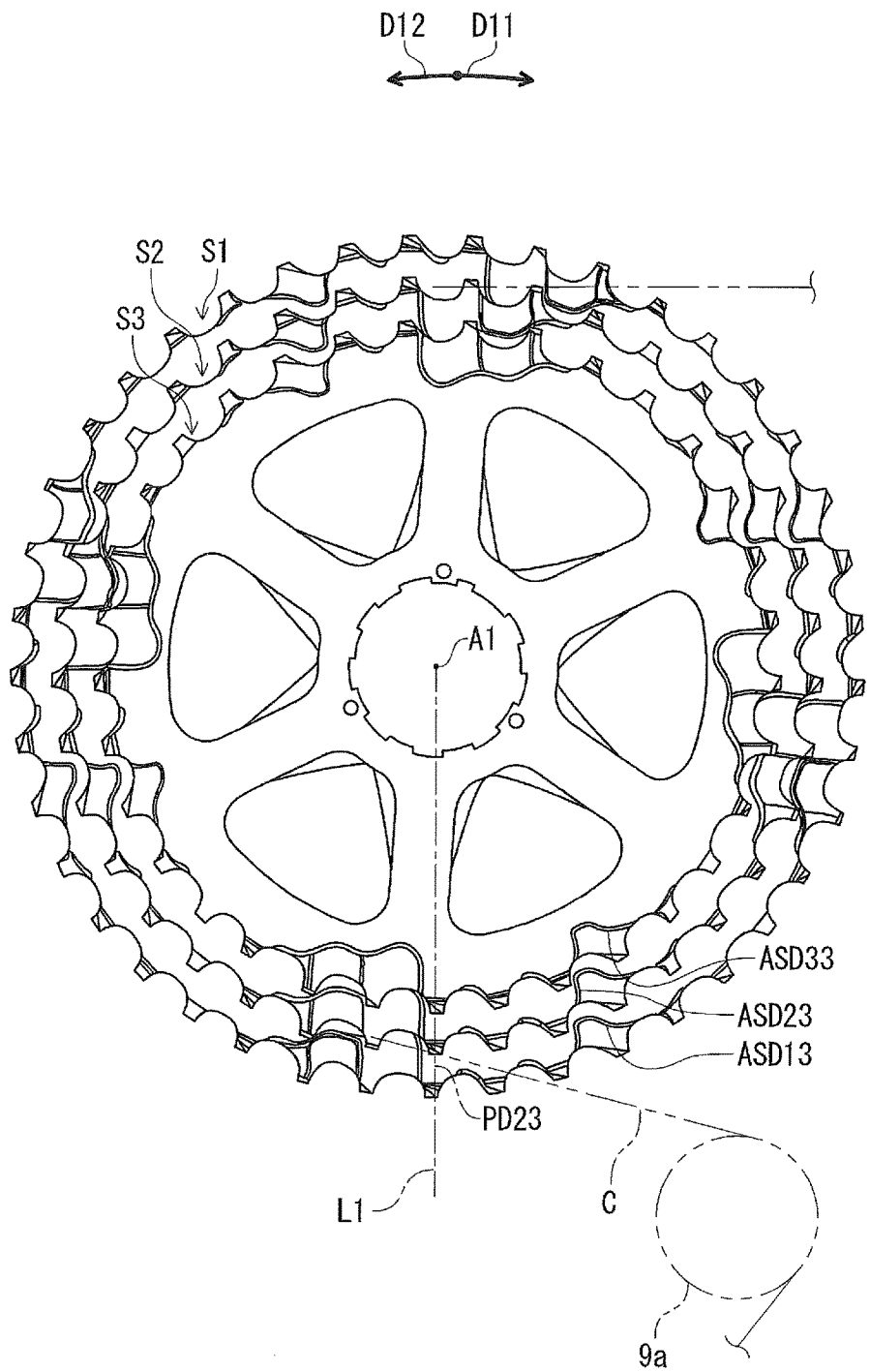
FIG. 12 is a side elevational view of the sprockets of the sprocket assembly illustrated in FIG. 2 for explaining operations of the sprocket assembly and a bicycle chain during downshifting.
Figure 13:
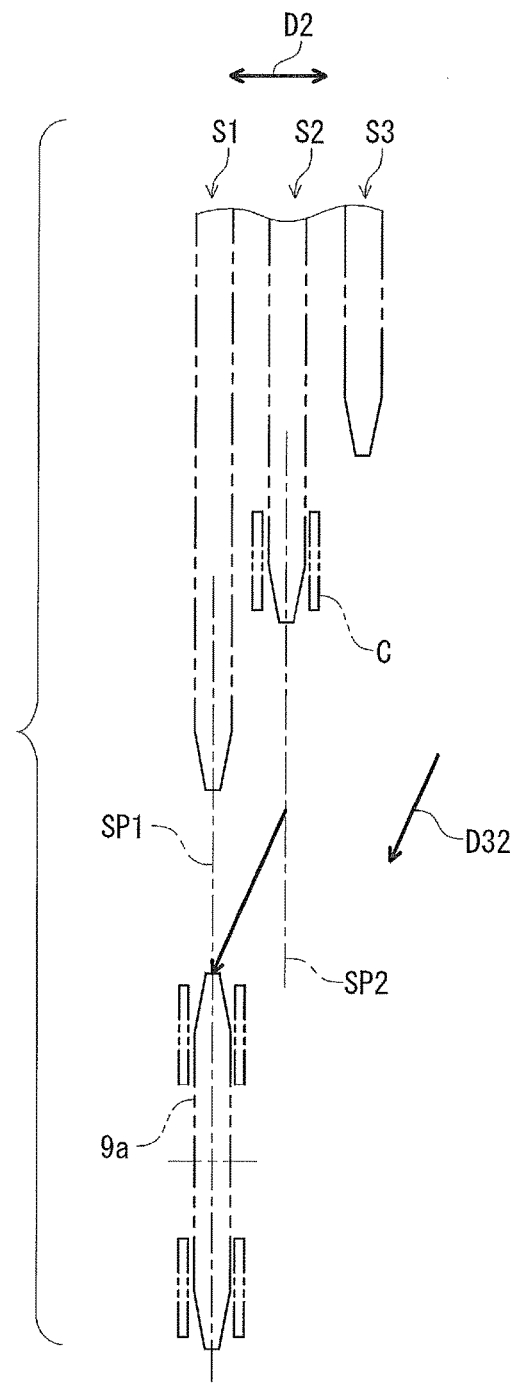
FIG. 13 is a partial rear elevational view of the sprockets of the sprocket assembly illustrated in FIG. 2 for explaining operation of a derailleur during downshifting.

As seen in FIGS. 12 and 13, for example, the derailleur 9 preferably completes shifting the chain guide 9a from a shift position SP2 (FIG. 13) corresponding to the sprocket S2 to a shift position SP1 (FIG. 13) corresponding to the sprocket S1 when or immediately before the reference rotational position PD23 reaches the reference line L1.

Figure 14:
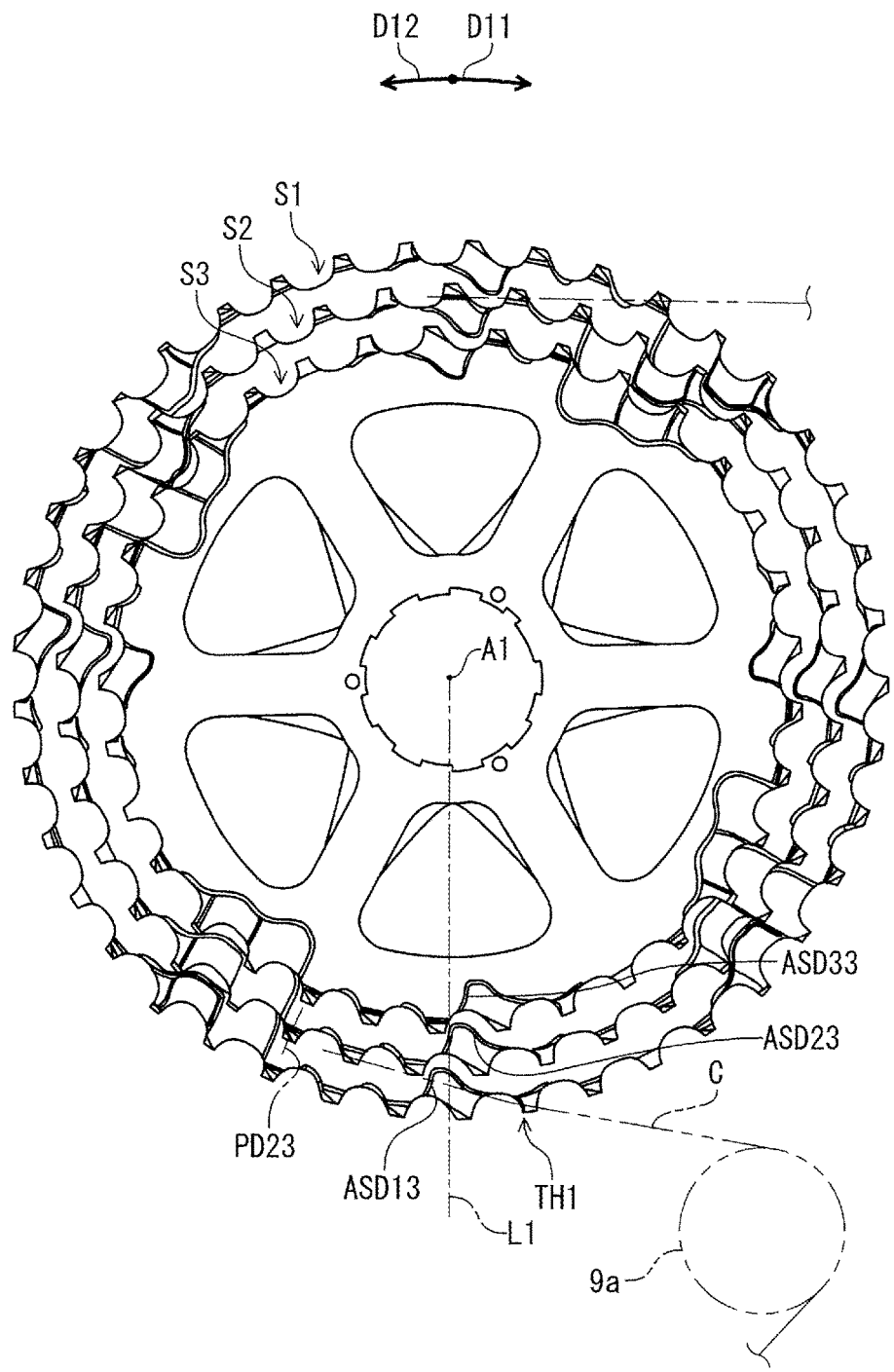
FIG. 14 is a side elevational view of the sprockets of the sprocket assembly illustrated in FIG. 2 for explaining operations of the sprocket assembly and a bicycle chain during downshifting.
Figure 15:
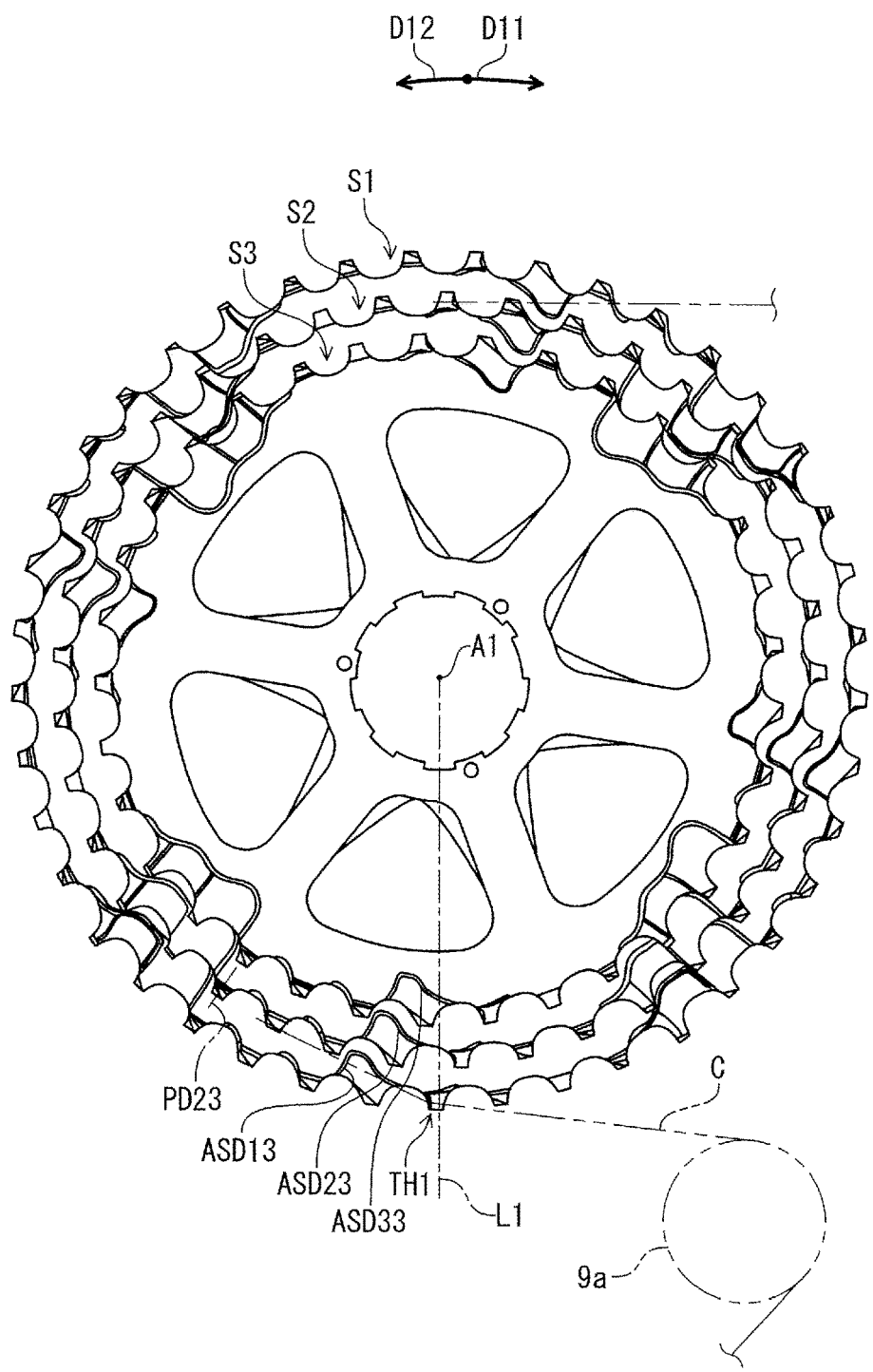
FIG. 15 is a side elevational view of the sprockets of the sprocket assembly illustrated in FIG. 2 for explaining operations of the sprocket assembly and the bicycle chain during downshifting.

As seen in FIGS. 14 and 15, for example, a tooth TH1 of the sprocket S1 engages with the bicycle chain C when the sprocket assembly 5 further rotates in the rotational driving direction D11. At this time, the downshift assist recesses ASD13 reduces interference between the sprocket S1 and the bicycle chain C.

Figure 16:
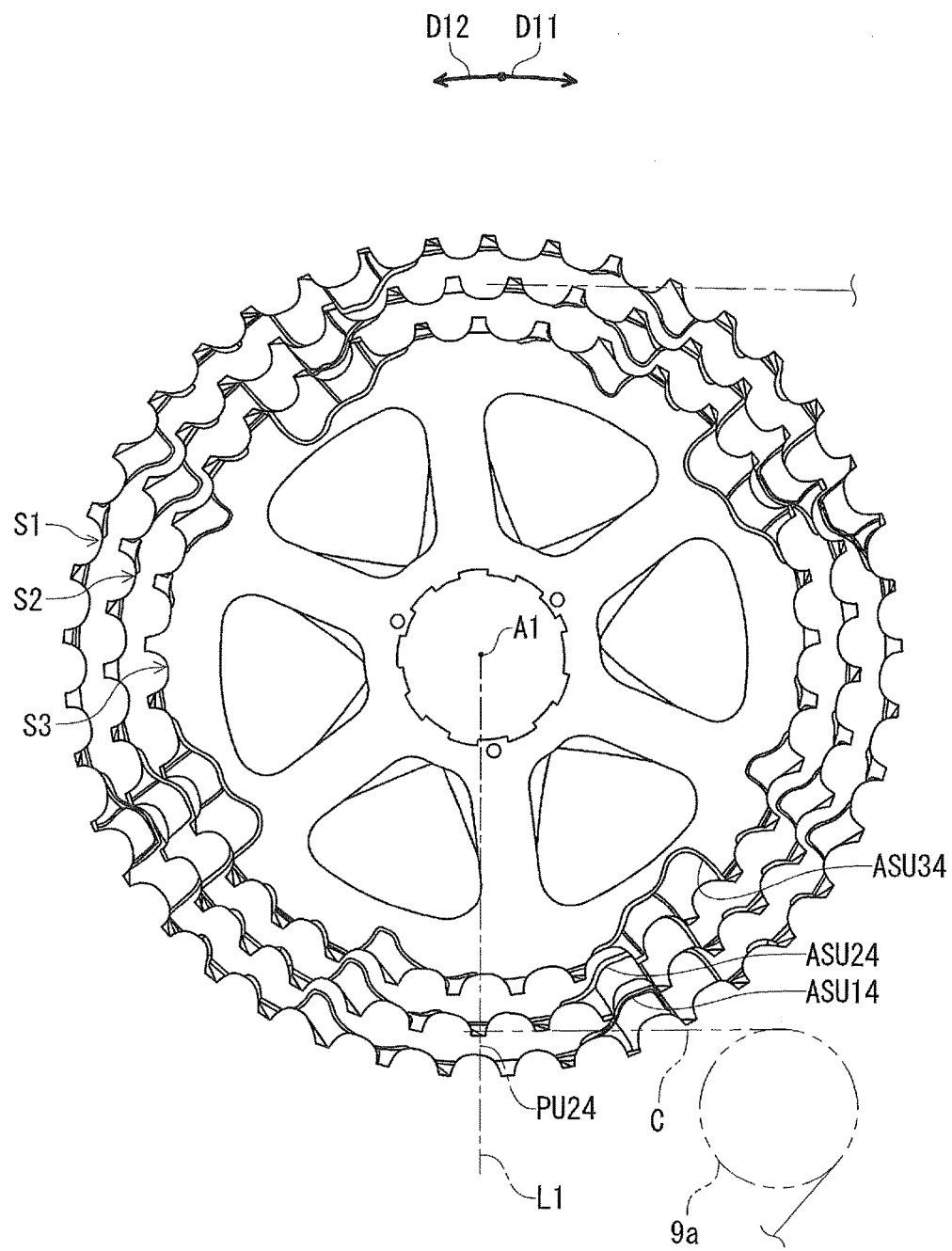
FIG. 16 is a side elevational view of the sprockets of the sprocket assembly illustrated in FIG. 2 for explaining operations of the sprocket assembly and the bicycle chain during upshifting.
Figure 17:
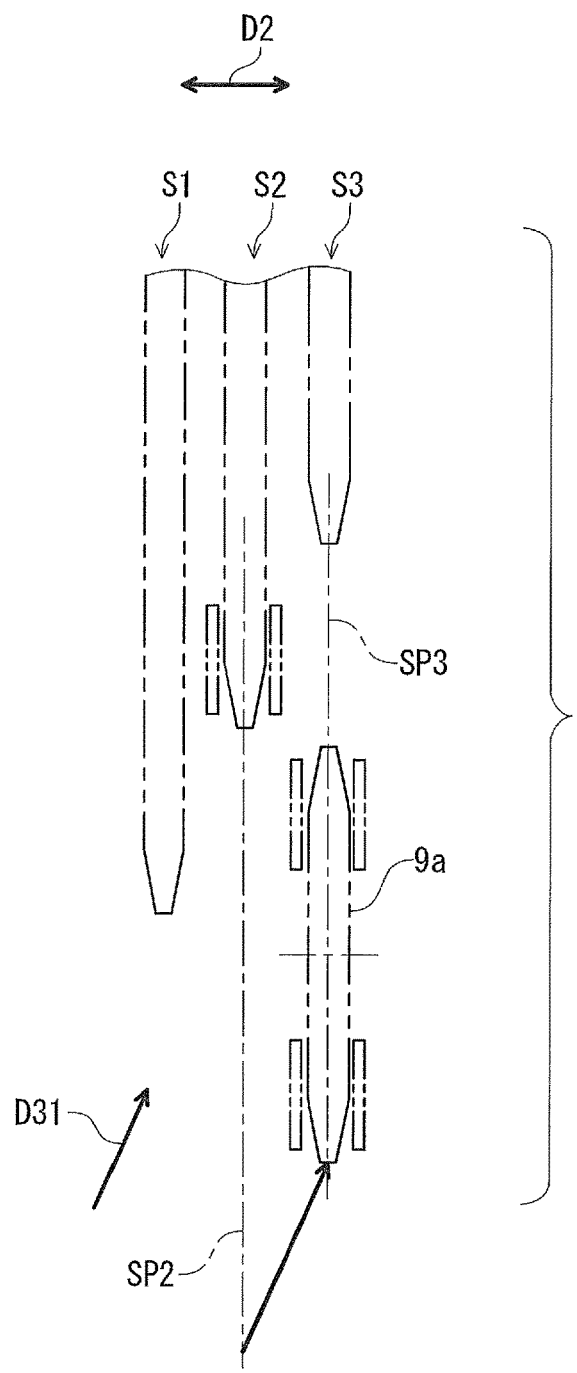
FIG. 17 is a partial rear elevational view of the sprockets of the sprocket assembly illustrated in FIG. 2 for explaining operation of the derailleur during upshifting.

As seen in FIGS. 16 and 17, the derailleur 9 preferably completes shifting the chain guide 9a from the shift position SP2 to a shift position SP3 corresponding to the sprocket S3 when or immediately before the reference rotational position PU24 reaches the reference line L1.

Figure 18:
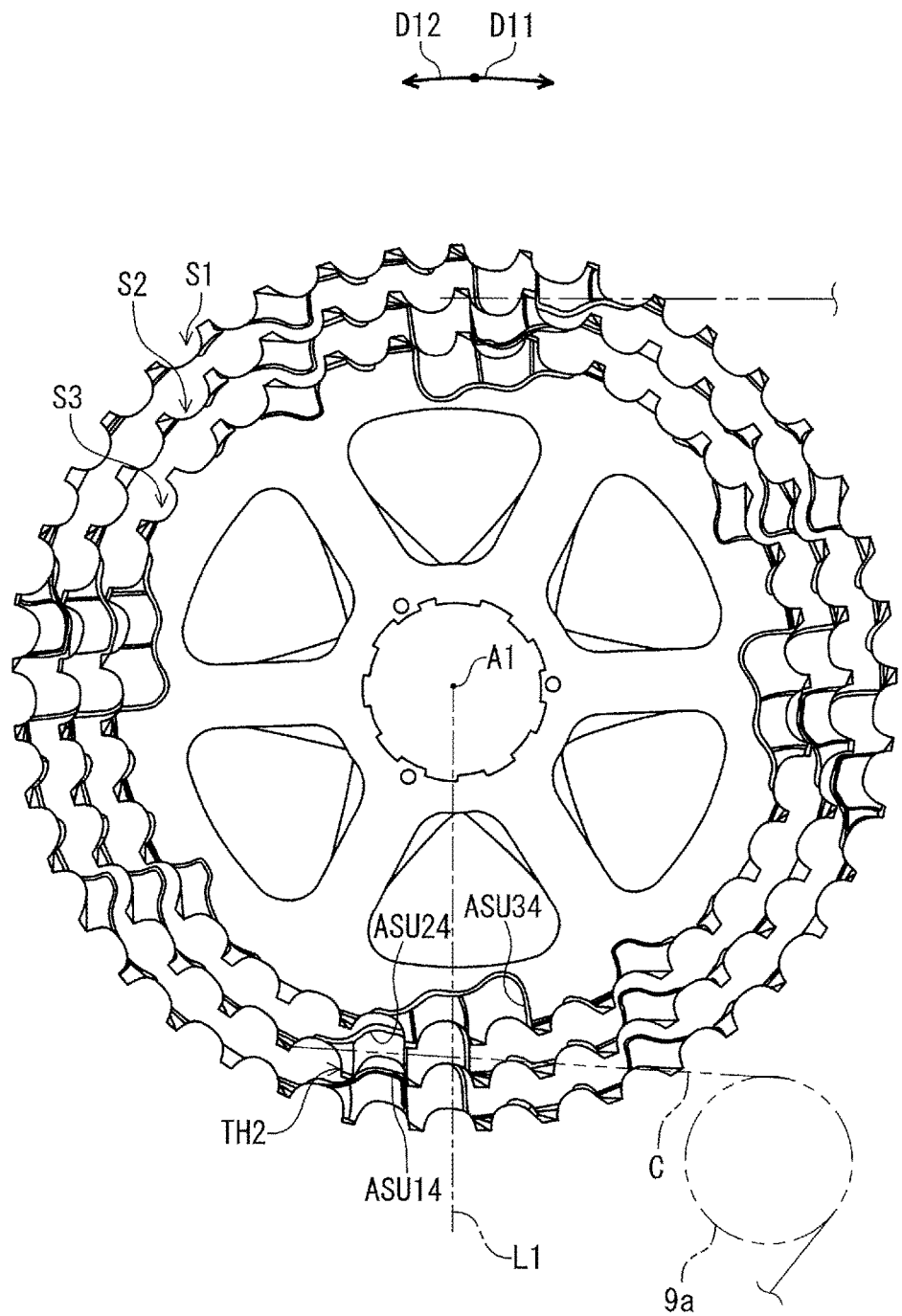
FIG. 18 is a side elevational view of the sprockets of the sprocket assembly illustrated in FIG. 2 for explaining operations of the sprocket assembly and the bicycle chain during downshifting.
Figure 19:
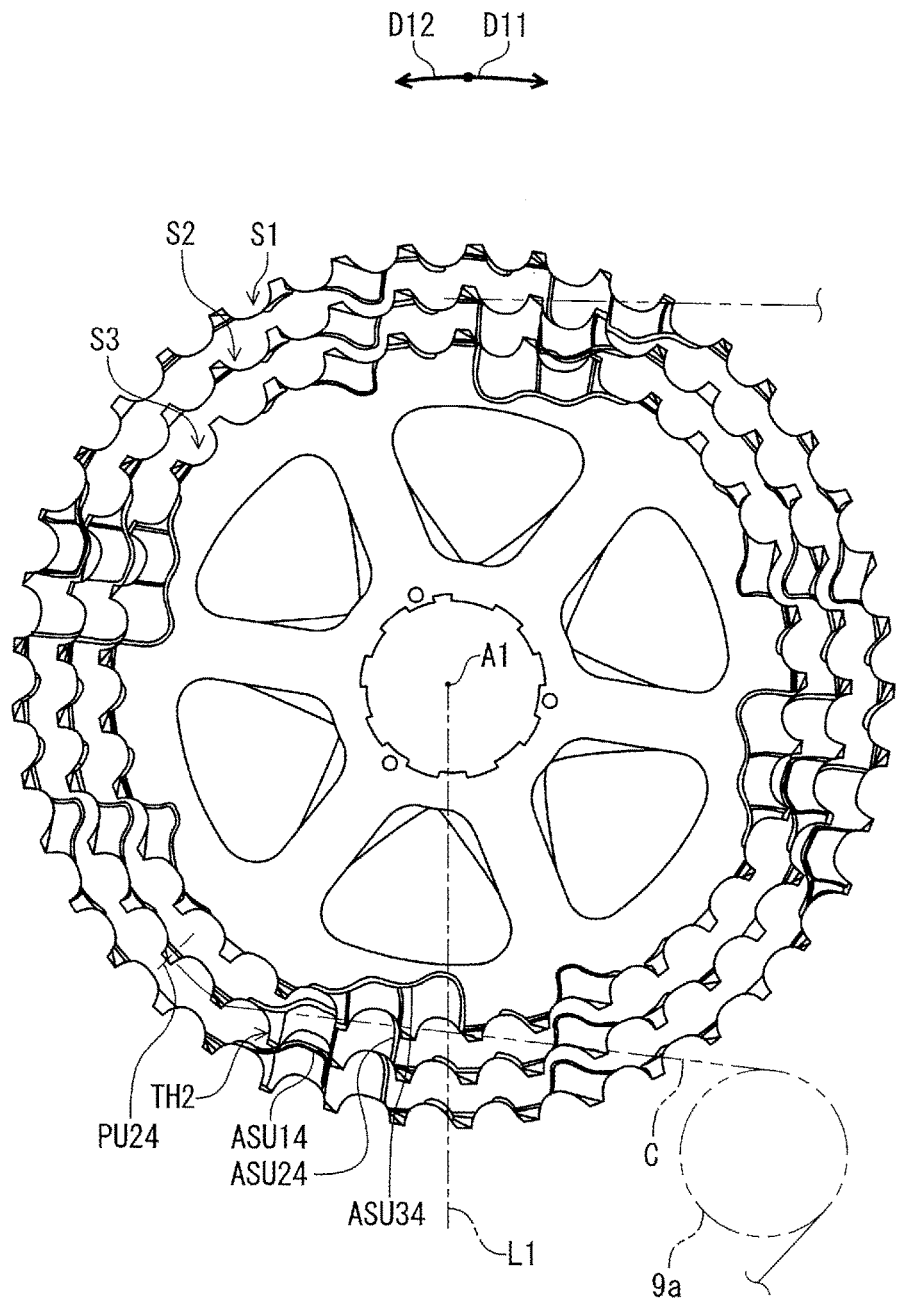
FIG. 19 is a side elevational view of the sprockets of the sprocket assembly illustrated in FIG. 2 for explaining operations of the sprocket assembly and the bicycle chain during downshifting.

As seen in FIGS. 18 and 19, for example, a tooth TH2 disengages from the bicycle chain C when the sprocket assembly 5 further rotates in the rotational driving direction D11. At this time, the downshift assist recesses ASU24 reduces interference between the sprocket S2 and the bicycle chain C.

As seen in FIG. 9, the transmission controller 42 is configured to calculate the shift timing at which the derailleur 9 starts to shift the bicycle chain C based on the operating time (FIG. 10), the current rotational position, the reference rotational position (FIG. 11), and the current rotational speed of the sprocket assembly 5.

More specifically, the transmission controller 42 is configured to calculate a rotation angle AG1 of the sprocket assembly 5 for the operating time T1 based on the operating time T1 and the current rotational speed RS1 based on the following formula (1).

$$AG1 = T1 \times RS1 \qquad (1)$$

The transmission controller 42 is configured to select a reference position group including the reference rotational positions from the reference rotational positions stored in the memory 46 based on the current shift position stored in the memory 46 and the operation signal inputted from the operating device 7. For example, the transmission controller 42 selects a reference position group including the reference rotational positions PU21 to PU24 (FIG. 11) when an upshifting signal is inputted from the operating device 7 in a case where the current shift position is the shift position SP2 (FIG. 13) corresponding to the sprocket S2.

The transmission controller 42 is configured to select, as a selected reference rotational position, one of the reference rotational positions from the reference position group which is selected based on the current shift position and the operation signal. More specifically, the transmission controller 42 is configured to select a reference rotational position which is closest to the current rotational position RP3 (FIG. 7) and which is disposed on a downstream side of the current rotational position RP3 from the reference position group. The current rotational position RP3 is a rotational position of the sprocket assembly 5 disposed on the reference line L1 (FIG. 7).

If the upshifting operation signal is inputted from the operating device 7 when the sprocket assembly 5 is disposed at a rotational position illustrated in FIG. 7, the transmission controller 42 selects the reference rotational position PU24 as the selected reference rotational position RP1. If the downshifting operation signal is inputted from the operating device 7 when the sprocket assembly 5 is disposed at a rotational position illustrated in FIG. 7, the transmission controller 42 selects the reference rotational position PD24 as the selected reference rotational position RP1.

The transmission controller 42 is configured to calculate, based on the rotation angle AG1 and the selected reference rotational position RP1, a starting rotational position RP2 (FIG. 7) where the derailleur 9 starts shifting the chain guide 9a from the current shift position to the target shift position adjacent to the current shift position using the following formula (2).

$$RP2 = RP1 - AG1 \quad (2)$$

The transmission controller 42 is configured to determine whether the starting rotational position RP2 is equal to or larger than the current rotational position RP3 (FIG. 7). More specifically, the transmission controller 42 is configured to determine whether the starting rotational position RP2 is disposed at a position equal to or on a downstream side of the current rotational position RP3 (FIG. 7). In the illustrated embodiment, for example, the current rotational position RP3 is a current rotational position sensed by the rotational-position sensing unit 32 when the operation signal to actuate the derailleur 9 is inputted from the operating device 7 to the transmission controller 42.

In a case where the transmission controller 42 determines that the starting rotational position RP2 is equal to or larger than the current rotational position RP3, the transmission controller 42 controls the derailleur 9 to start shifting the chain guide 9a from the current shift position to the adjacent shift position when the sprocket assembly 5 reaches the starting rotational position RP2.

In a case where the transmission controller 42 determines that the starting rotational position RP2 is smaller than the current rotational position RP3, the transmission controller 42 selects the reference rotational position arranged on a downstream side of the selected reference rotational position from the reference position group as the selected reference rotational position. As seen in FIG. 7, for example, the transmission controller 42 selects the reference rotational position PD24 arranged on a downstream side of the selected reference rotational position PD23 when the current shift position is a shift position corresponding to the sprocket S2.

The operation of the bicycle shifting control apparatus 12 will be described below referring to FIGS. 7 and 20 to 24.

Figure 20:
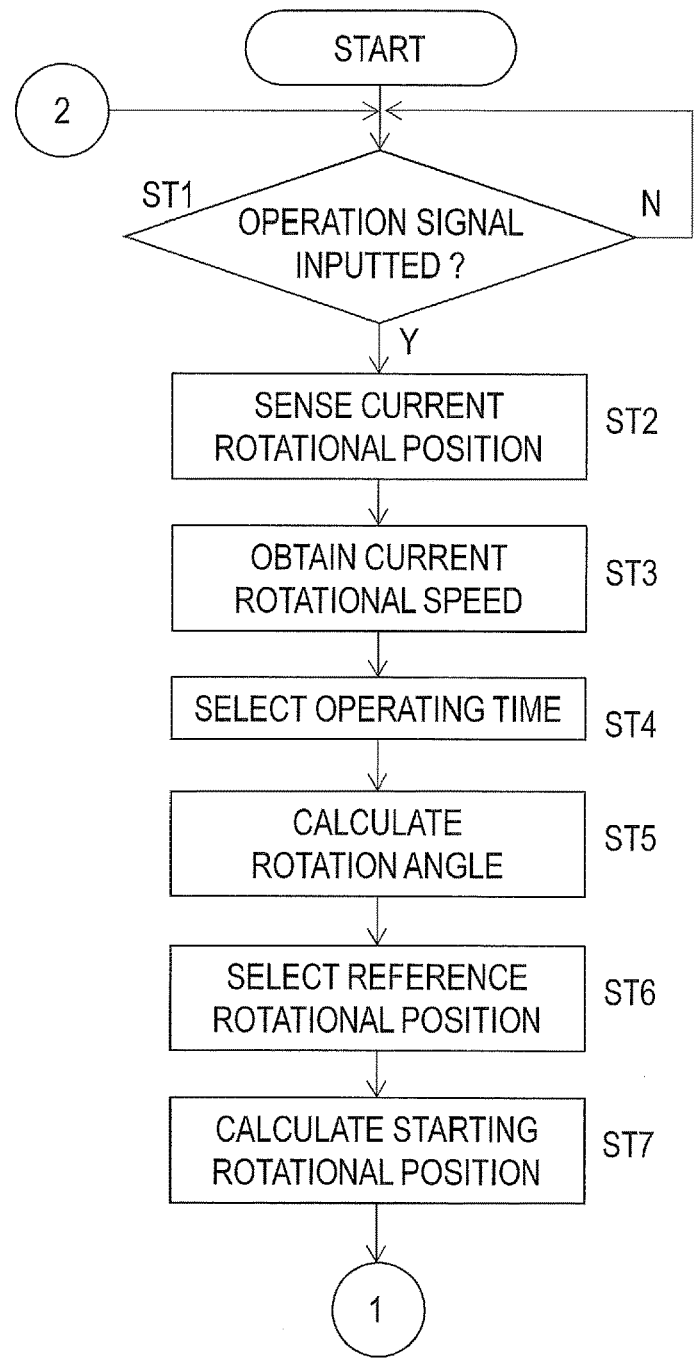
FIG. 20 is a flow chart showing an operation of the bicycle shifting control apparatus illustrated in FIG. 9.

As seen in FIG. 20, in step ST1, it is determined by the transmission controller 42 whether the operation signal is inputted from the operating device 7 to the transmission controller 42.

In step ST2, the current rotational position is sensed by rotational-position sensing unit 32 when the operation signal is inputted from the operating device 7 to the transmission controller 42 and is stored in the memory 46 as the current rotational position RP3.

In step ST3, the current rotational speed is obtained by the transmission controller 42. For example, the latest value of the rotational speed stored in the memory 46 is used as the current rotational speed RS1.

In step ST4, the operating time T1 is selected by the transmission controller 42 based on the current shift position stored in the memory 46 and the operation signal inputted from the operating device 7. For example, if the current shift positon is the shift position SP2 (FIG. 13) corresponding to the sprocket S2 and the operation signal is the downshifting operation signal, the operating time TD2 (FIG. 10) is selected as the operating time T1 by the transmission controller 42.

In step ST5, the rotation angle AG1 of the sprocket assembly 5 for the operating time T1 is calculated by the transmission controller 42 based on the formula (1), the current rotational speed RS1 sensed in step ST3, and the operating time T1 selected in step ST4. For example, when the current rotational speed RS1 is 360 [degree/sec] and the operating time TD2 is 0.0075 [sec], the rotation angle AG1 is calculated as shown in the following formula.

$$AG1 = T1 \times RS1 = 0.075 \times 360 = 27 \text{ [degree]}$$

In step ST6, the reference rotational position is selected by the transmission controller 42 based on the current shift position stored in the memory 46 and the operation signal inputted from the operating device 7. More specifically, the reference position group including at least one reference rotational position is selected by the transmission controller 42 based on the current shift position stored in the memory 46 and the operation signal inputted from the operating device 7. For example, the transmission controller 42 selects a reference position group including the reference rotational positions PU21 to PU24 when the upshifting operation signal is inputted from the operating device 7 in a case where the current shift position is the shift position SP2 (FIG. 13) corresponding to the sprocket S2.

One of the reference rotational positions is selected as the selected reference rotational position RP1 by the transmission controller 42 from the reference position group. In the illustrated embodiment, the transmission controller 42 is configured to select the reference rotational position which is closest to the current rotational position RP3 and disposed on a downstream side of the current rotational position RP3 from the reference position group. When the current rotational position RP3 of the sprocket assembly 5 is a position shown in FIG. 21, for example, the reference rotational position PU24 is selected by the transmission controller 42 from the reference rotational positions PU21 to PU24 of the sprocket S2.

As seen in FIG. 20, in step ST7, the starting rotational position RP2 is calculated by the transmission controller 42 based on the rotation angle AG1, the selected reference rotational position RP1, and the formula (2). For example, when the rotation angle AG1 is 27 [degree/sec] and an angle of the selected reference rotational position RP1 is 230 [degree], the starting rotational position RP2 is calculated as shown in the following formula.

RP2=RP1−AG1=230−27=203 [degree]

Figure 21:
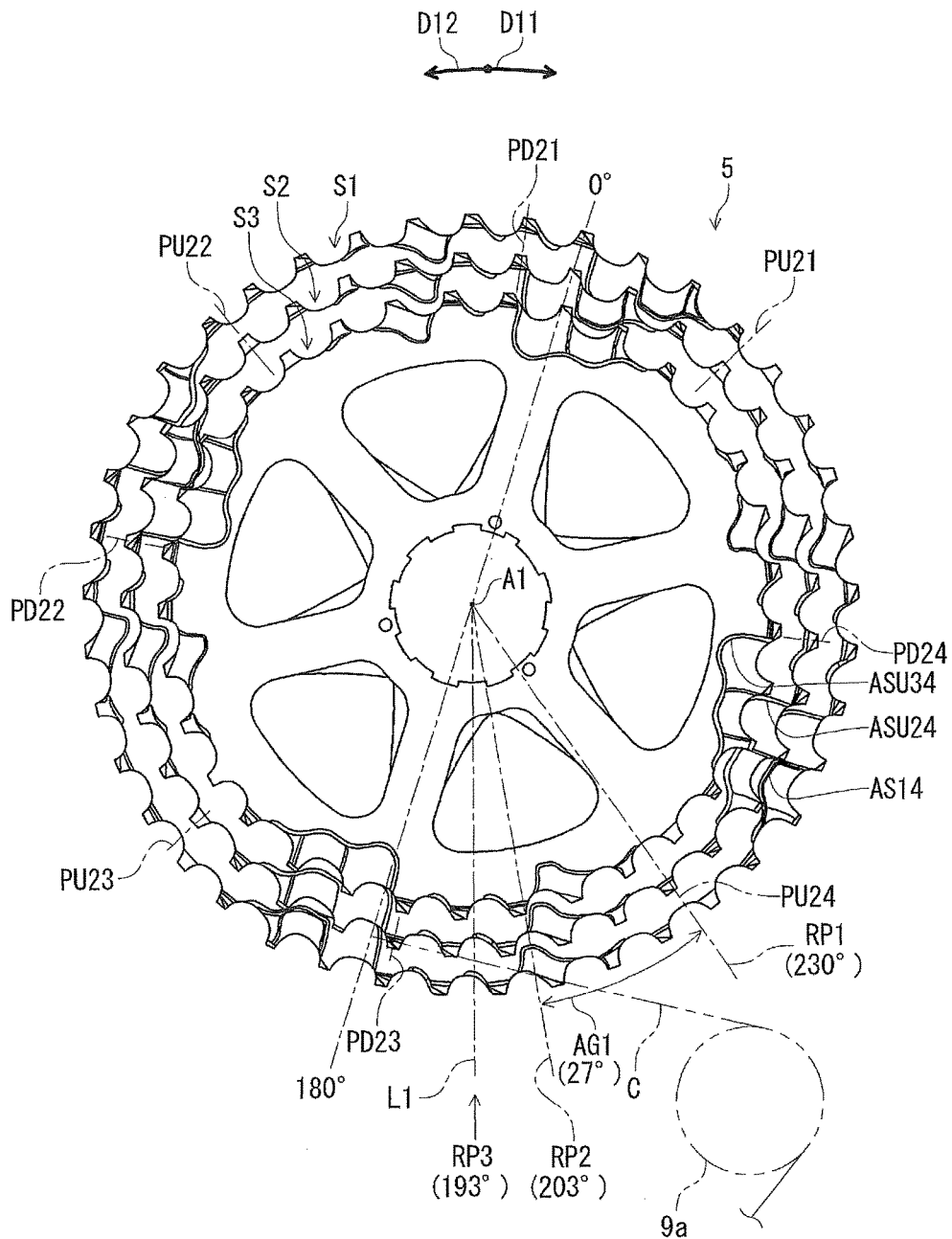
FIG. 21 is a side elevational view of the sprockets of the sprocket assembly illustrated in FIG. 2 for explaining relationship between a reference rotational position, a starting rotational position, and a current rotational position.
Figure 22:
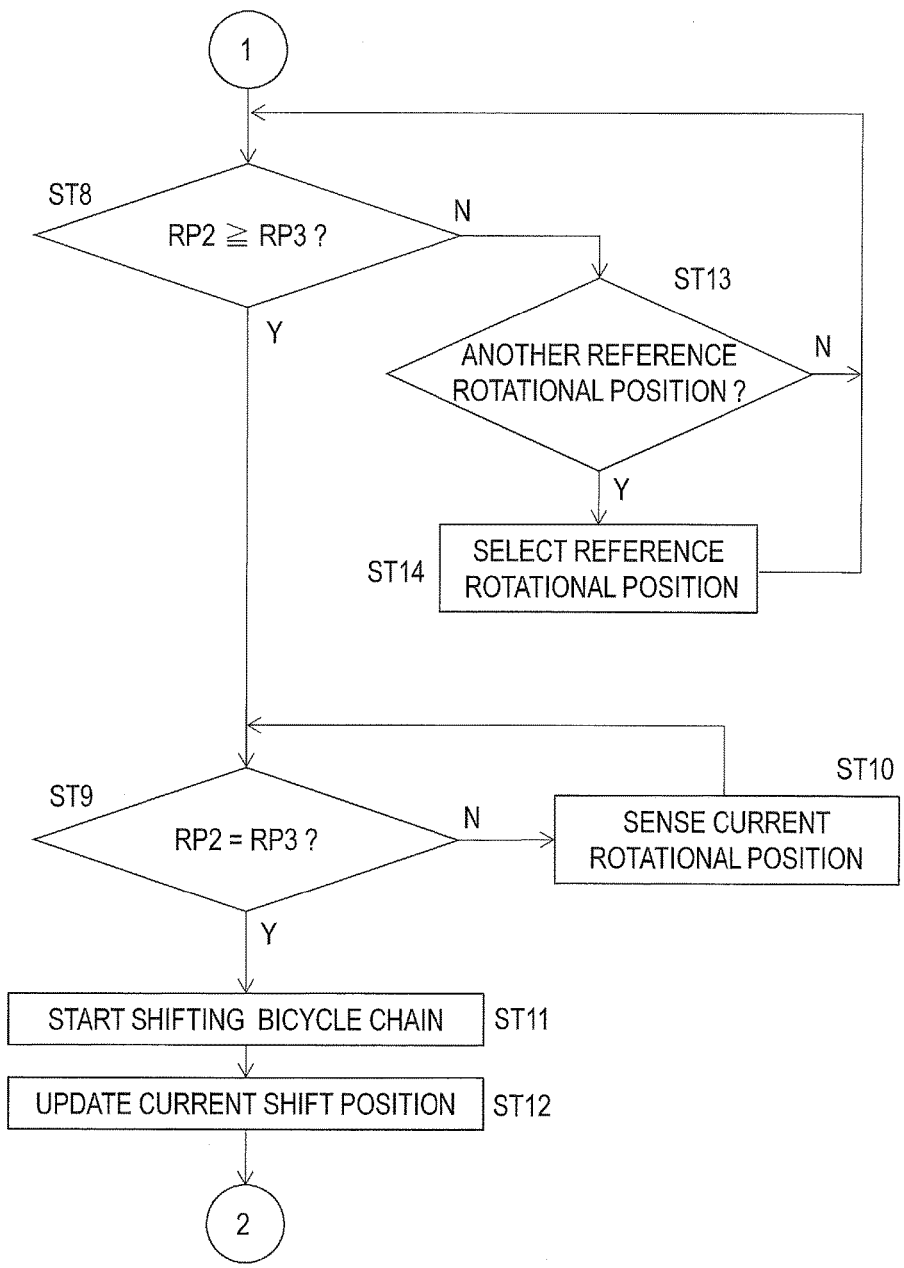
FIG. 22 is a flow chart showing an operation of the bicycle shifting control apparatus illustrated in FIG. 9.

As seen in FIG. 22, in steps ST8 and ST9, it is determined by the transmission controller 42 whether the starting rotational position RP2 is equal to or larger than the current rotational position RP3. As seen in FIG. 21, in a case where the starting rotational position RP2 is larger than the current rotational position RP3, the current rotational position RP3 is repeatedly sensed by the rotational-position sensing unit 32 until the current rotational position RP3 is equal to the starting rotational position RP2 (step ST10). Namely, the transmission controller 42 controls the derailleur 9 to delay starting to shift the bicycle chain C until the current rotational position RP3 is equal to the starting rotational position RP2.

Figure 23:
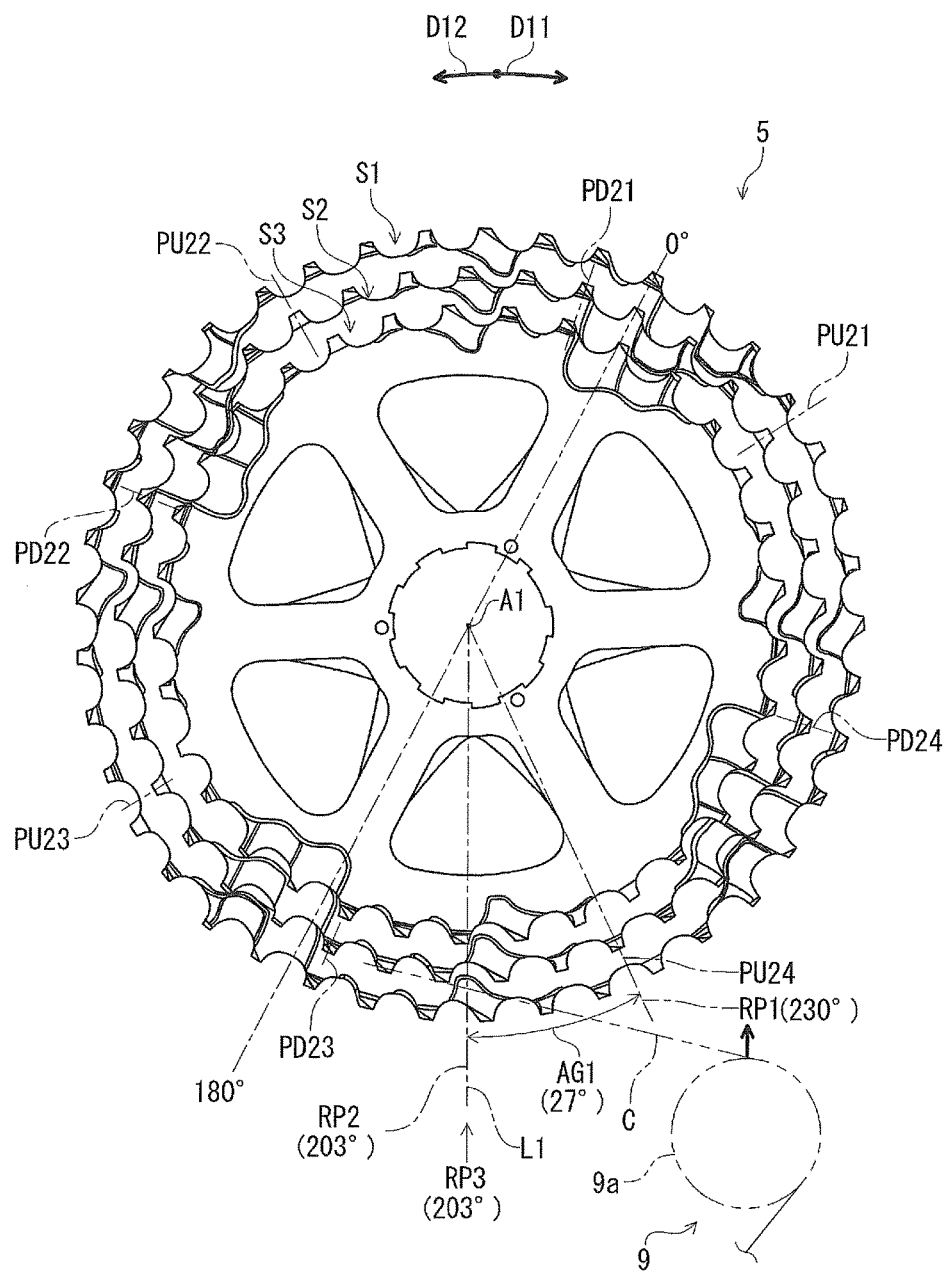
FIG. 23 is a side elevational view of the sprockets of the sprocket assembly illustrated in FIG. 2 for explaining relationship between the reference rotational position, the starting rotational position, and the current rotational position.
Figure 24:
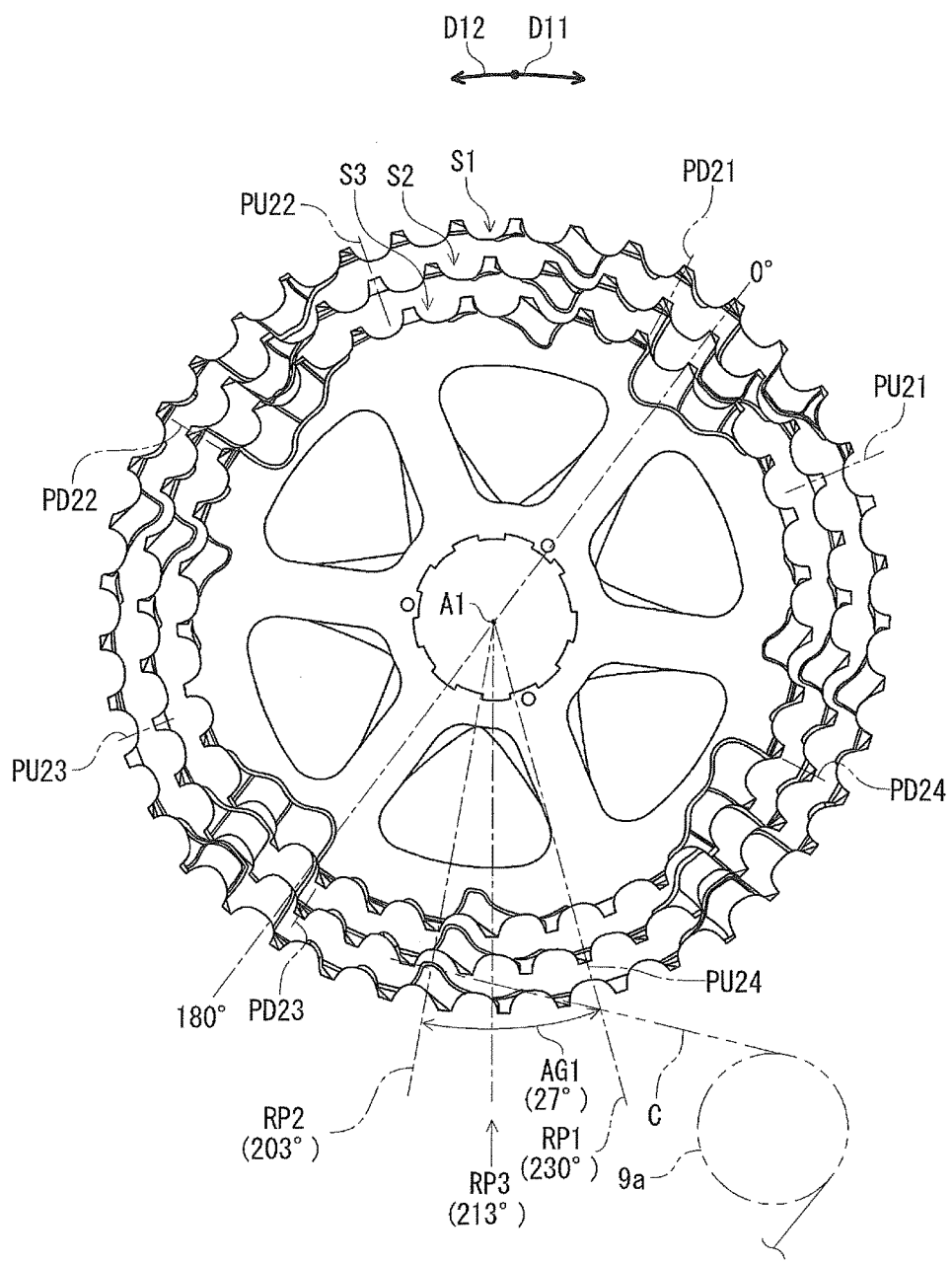
FIG. 24 is a side elevational view of the sprockets of the sprocket assembly illustrated in FIG. 2 for explaining relationship between the reference rotational position, the starting rotational position, and the current rotational position.

As seen in FIGS. 22 and 23, in a case where the starting rotational position RP2 is equal to the current rotational position RP3, the derailleur 9 is controlled by the transmission controller 42 to start shifting the bicycle chain C. More specifically, the derailleur 9 is controlled by the transmission controller 42 to start shifting the chain guide 9a from the current shift position to the adjacent shift position (step ST11). Thus, the derailleur 9 completes shifting the chain guide 9a from the current shift position to the target shift position when or immediately before the sprocket assembly 5 reaches the selected reference rotational position RP1 (FIG. 16). This can shorten time for which the bicycle chain C slides with an axial surface of the sprocket, allowing the shifting of the bicycle chain to be smoother. In step ST12, the current shift position is updated by the transmission controller 42, and the process returns to step ST1 (FIG. 20).

In step ST8 of FIG. 22, in a case where the starting rotational position RP2 is smaller than the current rotational position RP3 (FIG. 24), it is determined by the transmission controller 42 whether another reference rotational position exists in the sprocket corresponding to the current shift position (step ST13). In a case where another reference rotational position exists, the reference rotational position arranged on a downstream side of the selected reference rotational position is newly selected from the reference position group as the selected reference rotational position (step ST14). For example, the transmission controller 42 selects the reference rotational position PU21 arranged on a downstream side of the reference rotational position PU24. In a case where no other reference rotational position exists, step ST8 is repeated.

With the bicycle shifting control apparatus 12, the transmission controller 42 is configured to control the derailleur 9 based on the rotational position sensed by the rotational-position sensing unit 32. Accordingly, it is possible to adjust a timing at which the derailleur 9 shifts the bicycle chain C based on the rotational position sensed by the rotational-position sensing unit 32. This allows the shifting of the bicycle chain C to be smoother.

Second Embodiment

A bicycle shifting control apparatus 212 in accordance with a second embodiment will be described below referring to FIG. 25. The bicycle shifting control apparatus 212 has the same configuration as the bicycle shifting control apparatus 12 except for the arrangement of the sensing target and the rotational-position sensing unit. Thus, elements having substantially the same function as those in the first embodiment will be numbered the same here, and will not be described and/or illustrated again in detail here for the sake of brevity.

Figure 25:
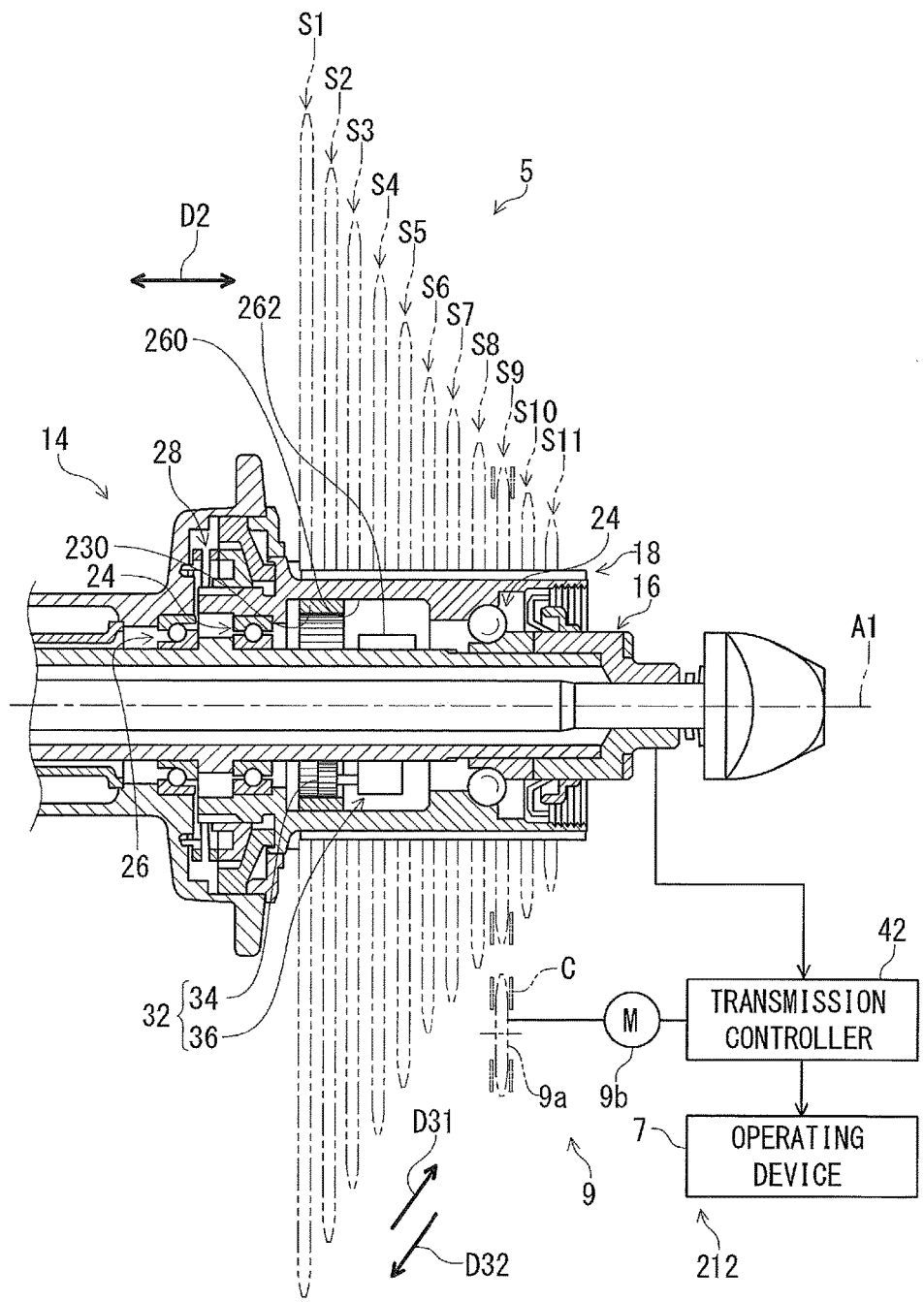
FIG. 25 is a partial half cross-sectional view of the bicycle hub assembly with a bicycle shifting control apparatus in accordance with a second embodiment.

As seen in FIG. 25, unlike the first embodiment, the rotational-position sensing unit 32 of the bicycle shifting control apparatus 212 is provided inside the housing member 18. The rotational-position sensing unit 32 is provided between the axle member 16 and the housing member 18. More specifically, the rotational-position sensing unit 32 is provided between the axle member 16 and the housing member 18 in a radial direction perpendicular to the rotational center axis A1. The rotational-position sensing unit 32 is mounted on an outer periphery of the axle member 16.

A cavity 260 is defined between the axle member 16 and the housing member 18. The cavity 260 is provided between the first bearing assemblies 24 in the axial direction D2. The cavity 260 has an annular shape. The rotational-position sensing unit 32 is provided in the cavity 260.

As seen in FIG. 25, the bicycle shifting control apparatus 212 further comprises a sensing target 230 rotatable with the sprocket assembly 5. The rotational-position sensing unit 32 is configured to contact the sensing target 230 to sense a rotational position of the sensing target 230 as the rotational position of the sprocket assembly 5.

The sensing target 230 is provided inside the housing member 18. The sensing target 230 is provided between the axle member 16 and the housing member 18. More specifically, the sensing target 230 is provided between the axle member 16 and the housing member 18 in the radial direction perpendicular to the rotational center axis A1. The sensing target 230 is provided in the cavity 260. The sensing target 230 is mounted on an inner periphery of the housing member 18.

As seen in FIG. 25, the sensing target 230 comprises an output gear rotatable with the sprocket assembly 5. The sensing gear 34 is configured to mesh with the output gear. The sensor 36 is configured to sense the rotational position of the sensing target 230 based on a rotational position of the sensing gear 34.

In the illustrated embodiment, the sensing target 230 is a ring gear including internal teeth provided on an inner periphery of the ring gear. The sensing gear 34 is provided radially inward of the sensing target 230 to mesh with the internal teeth of the sensing target 230.

As seen in FIG. 25, the bicycle shifting control apparatus 212 can include a battery 262 configured to supply electrical power to the rotational-position sensing unit 32. The battery 262 is provided in the cavity 260. The battery 262 is mounted on the outer periphery of the axle member 16. The rotational-position sensing unit 32 is electrically connected to the battery 262. The rotational-position sensing unit 32 can electrically connected to the battery unit BU (FIG. 1) if needed and/or desired.

The transmission controller 42 of the bicycle shifting control apparatus 212 is configured to control the derailleur 9 as described in the first embodiment. Thus, with the bicycle shifting control apparatus 212, it is possible to obtain substantially the same advantageous effect as that of the bicycle shifting control apparatus 12 in accordance with the first embodiment.

Furthermore, since the sensing target 230 and the rotational-position sensing unit 32 are provided inside the housing member 18 of the bicycle hub assembly 14, it is possible to simplify the construction of the bicycle shifting control apparatus 212.

Third Embodiment

A bicycle shifting control apparatus 312 in accordance with a third embodiment will be described below referring to FIG. 26. The bicycle shifting control apparatus 312 has the same configuration as the bicycle shifting control apparatus 212 except for the sensing target and the rotational-position sensing unit. Thus, elements having substantially the same function as those in the above embodiments will be numbered the same here, and will not be described and/or illustrated again in detail here for the sake of brevity.

Figure 26:
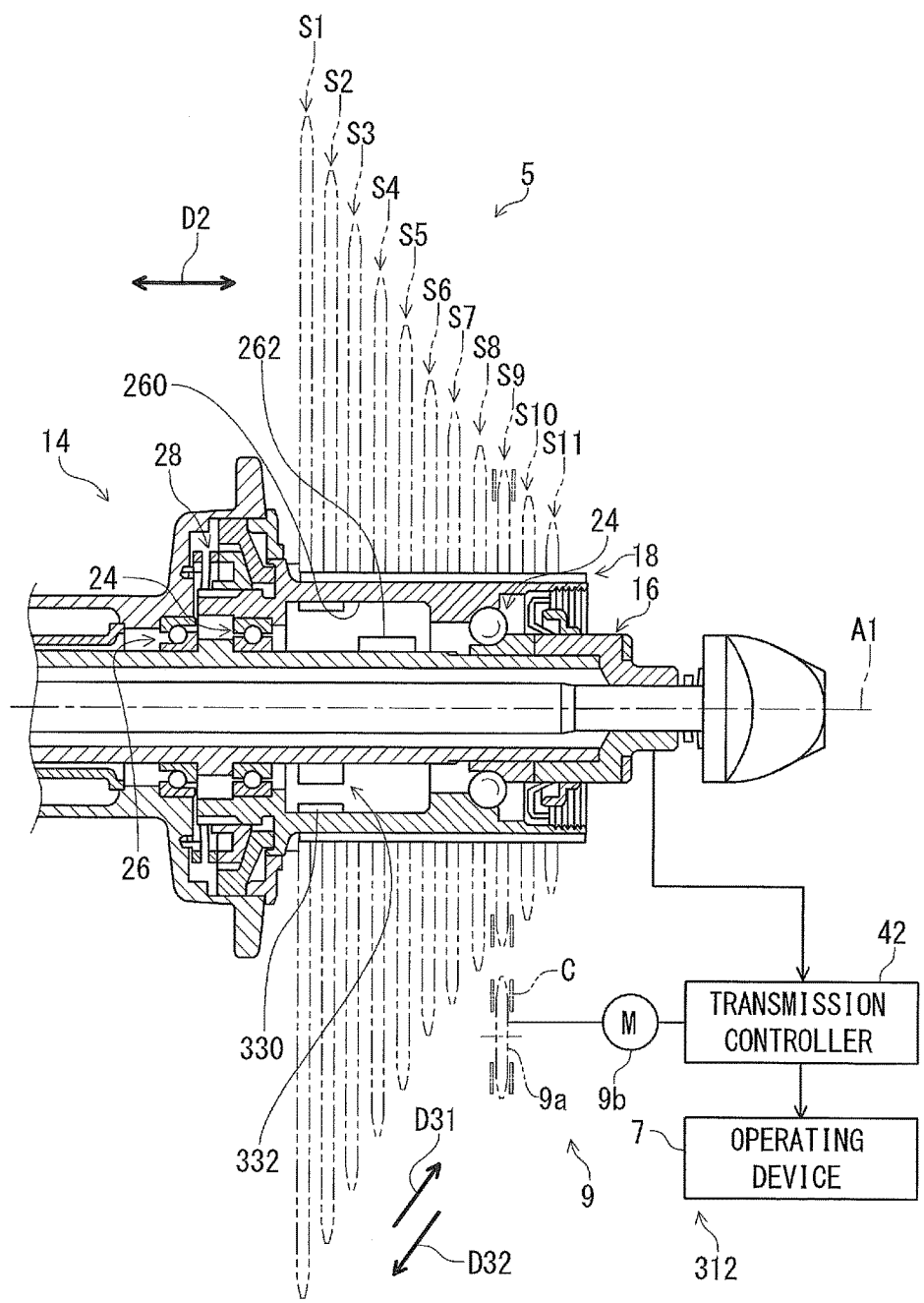
FIG. 26 is a partial half cross-sectional view of the bicycle hub assembly with a bicycle shifting control apparatus in accordance with a third embodiment.

As seen in FIG. 26, the bicycle shifting control apparatus 312 comprises a rotational-position sensing unit 332 and the transmission controller 42. The rotational-position sensing unit 332 is configured to sense a rotational position of the sprocket assembly 5 configured to be rotatably supported by the housing member 18 configured to be rotatable relative to the axle member 16. The transmission controller 42 is configured to control the derailleur 9 based on the rotational position sensed by the rotational-position sensing unit 332.

As well as the second embodiment, the rotational-position sensing unit 332 is provided inside the housing member 18. The rotational-position sensing unit 332 is provided between the axle member 16 and the housing member 18. More specifically, the rotational-position sensing unit 332 is provided between the axle member 16 and the housing member 18 in the radial direction perpendicular to the rotational center axis A1. The rotational-position sensing unit 332 is provided in the cavity 260.

As seen in FIG. 26, the bicycle shifting control apparatus 312 further comprises a sensing target 330 rotatable with the sprocket assembly 5. The sensing target 330 is provided inside the bicycle hub assembly 14. The sensing target 330 is provided between the axle member 16 and the housing member 18. More specifically, the sensing target 330 is provided between the axle member 16 and the housing member 18 in the radial direction perpendicular to the rotational center axis A1. The sensing target 330 is provided in the cavity 260.

Unlike the rotational-position sensing unit 32 in accordance with the second embodiment, however, the rotational-position sensing unit 332 is configured to sense a rotational position of the sensing target 330 as the rotational position of the sprocket assembly 5 without contacting the sensing target 330. The sensing target 330 is mounted on the inner periphery of the housing member 18. The rotational-position sensing unit 332 is mounted on the outer periphery of the axle member 16 to face the sensing target 330. The rotational-position sensing unit 332 is spaced apart from the sensing target 330 in the radial direction.

Possible examples of the rotational-position sensing unit 332 include a non-contact rotational position sensor such as an optical sensor and a magnetic sensor. Possible examples of the optical sensor include a rotary encoder. Possible examples of the magnetic sensor include a sensor having a magnetic resistance element, and a hall sensor having a hall element.

The sensing target 330 has an annular shape. The sensing target 330 has position information indicating an absolute rotational position of the sprocket assembly 5. Possible examples of the sensing target 330 include an optical pattern and a magnetic pattern. The rotational-position sensing unit 332 is configured to sense the position information of the sensing target 330.

The transmission controller 42 of the bicycle shifting control apparatus 312 is configured to control the derailleur 9 as described in the first embodiment. Thus, with the bicycle shifting control apparatus 312, it is possible to obtain substantially the same advantageous effect as that of the bicycle shifting control apparatus 12 in accordance with the first embodiment.

Furthermore, since the sensing target 330 and the rotational-position sensing unit 332 are provided inside the housing member 18 of the bicycle hub assembly 14, it is possible to simplify the construction of the bicycle shifting control apparatus 312 as well as the second embodiment.

Fourth Embodiment

A bicycle shifting control apparatus 412 in accordance with a fourth embodiment will be described below referring to FIG. 27. The bicycle shifting control apparatus 412 has the same configuration as the bicycle shifting control apparatus 212 except for the sensing target and the rotational-position sensing unit. Thus, elements having substantially the same function as those in the above embodiments will be numbered the same here, and will not be described and/or illustrated again in detail here for the sake of brevity.

Figure 27:
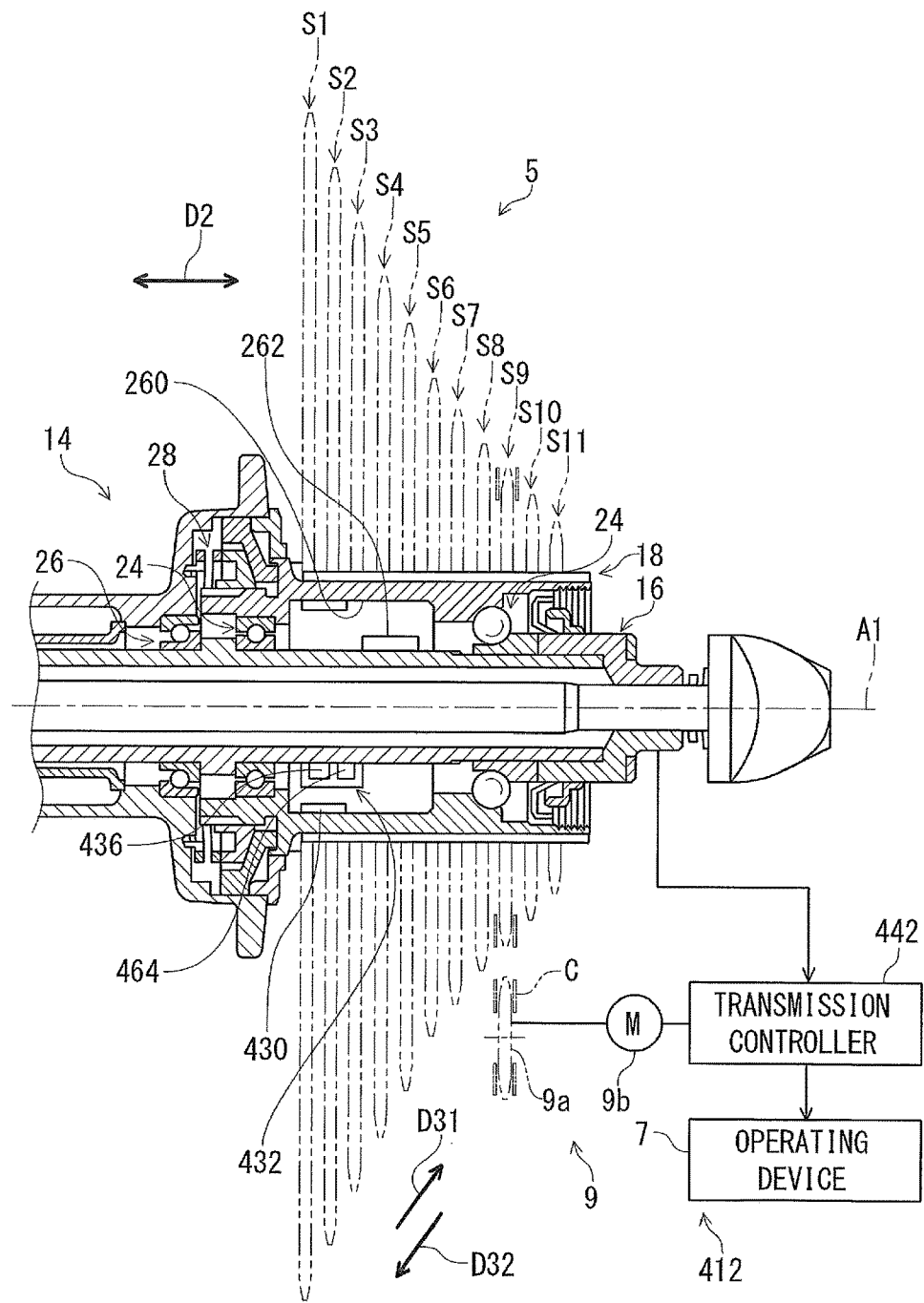
FIG. 27 is a partial half cross-sectional view of the bicycle hub assembly with a bicycle shifting control apparatus in accordance with a fourth embodiment.

As seen in FIG. 27, the bicycle shifting control apparatus 412 comprises a sensing target 430, a rotational-position sensing unit 432, and a transmission controller 442. The sensing target 430 is rotatable with the sprocket assembly 5. The rotational-position sensing unit 432 is configured to sense a rotational position of the sprocket assembly 5.

As well as the second embodiment, the rotational-position sensing unit 432 is provided inside the housing member 18. The rotational-position sensing unit 432 is provided between the axle member 16 and the housing member 18. More specifically, the rotational-position sensing unit 432 is provided between the axle member 16 and the housing member 18 in the radial direction perpendicular to the rotational center axis A1. The rotational-position sensing unit 432 is provided on the outer periphery of the axle member 16. The rotational-position sensing unit 432 is provided in the cavity 260.

As seen in FIG. 27, the sensing target 430 is provided inside the bicycle hub assembly 14. The sensing target 430 is provided between the axle member 16 and the housing member 18. More specifically, the sensing target 430 is provided between the axle member 16 and the housing member 18 in the radial direction perpendicular to the rotational center axis A1. The sensing target 430 is provided on the inner periphery of the housing member 18. The sensing target 430 is provided in the cavity 260.

Unlike the above embodiments, the rotational-position sensing unit 432 includes an imaging sensor 436 configured to capture a target image of the sensing target 430. The rotational-position sensing unit 432 can include a lighting element 464 configured to at least partially illuminate the sensing target 430. Namely, the rotational-position sensing unit 432 is configured to sense the rotational position of the sprocket assembly 5 without contacting the sensing target 430. Possible examples of the lighting element 464 include a light-emitting diode.

The transmission controller 442 is configured to calculate a rotational position of the sprocket assembly 5 based on the target image captured by the imaging sensor 436. The transmission controller 442 is configured to control the derailleur 9 based on the rotational position calculated by the transmission controller 442. The transmission controller 442 has substantially the same functions as those of the transmission controller 42 in accordance with the first embodiment except for the image processing function. Accordingly, the same functions will not be described again in detail here for the sake of brevity.

The sensing target 430 comprises a reference pattern indicating an absolute rotational position of the sprocket assembly 5. The imaging sensor 436 is configured to capture a pattern image of the reference pattern as the target image. The sensing target 430 has an annular shape.

The transmission controller 442 is configured to calculate the absolute rotational position of the sprocket assembly 5 based on the pattern image captured by the imaging sensor 436. The transmission controller 442 is configured to control the derailleur 9 based on the absolute rotational position calculated by the transmission controller 442.

The transmission controller 442 of the bicycle shifting control apparatus 412 is configured to control the derailleur 9 as described in the first embodiment. Thus, with the bicycle shifting control apparatus 412, it is possible to obtain substantially the same advantageous effect as that of the bicycle shifting control apparatus 12 in accordance with the first embodiment.

Furthermore, since the sensing target 430 and the rotational-position sensing unit 432 are provided inside the housing member 18 of the bicycle hub assembly 14, it is possible to simplify the construction of the bicycle shifting control apparatus 312 as well as the second embodiment.

Fifth Embodiment

A bicycle shifting control apparatus 512 in accordance with a fifth embodiment will be described below referring to FIG. 28. The bicycle shifting control apparatus 512 has the same configuration as the bicycle shifting control apparatus 12 except for the sensing target and the rotational-position sensing unit. Thus, elements having substantially the same function as those in the above embodiments will be numbered the same here, and will not be described and/or illustrated again in detail here for the sake of brevity.

Figure 28:
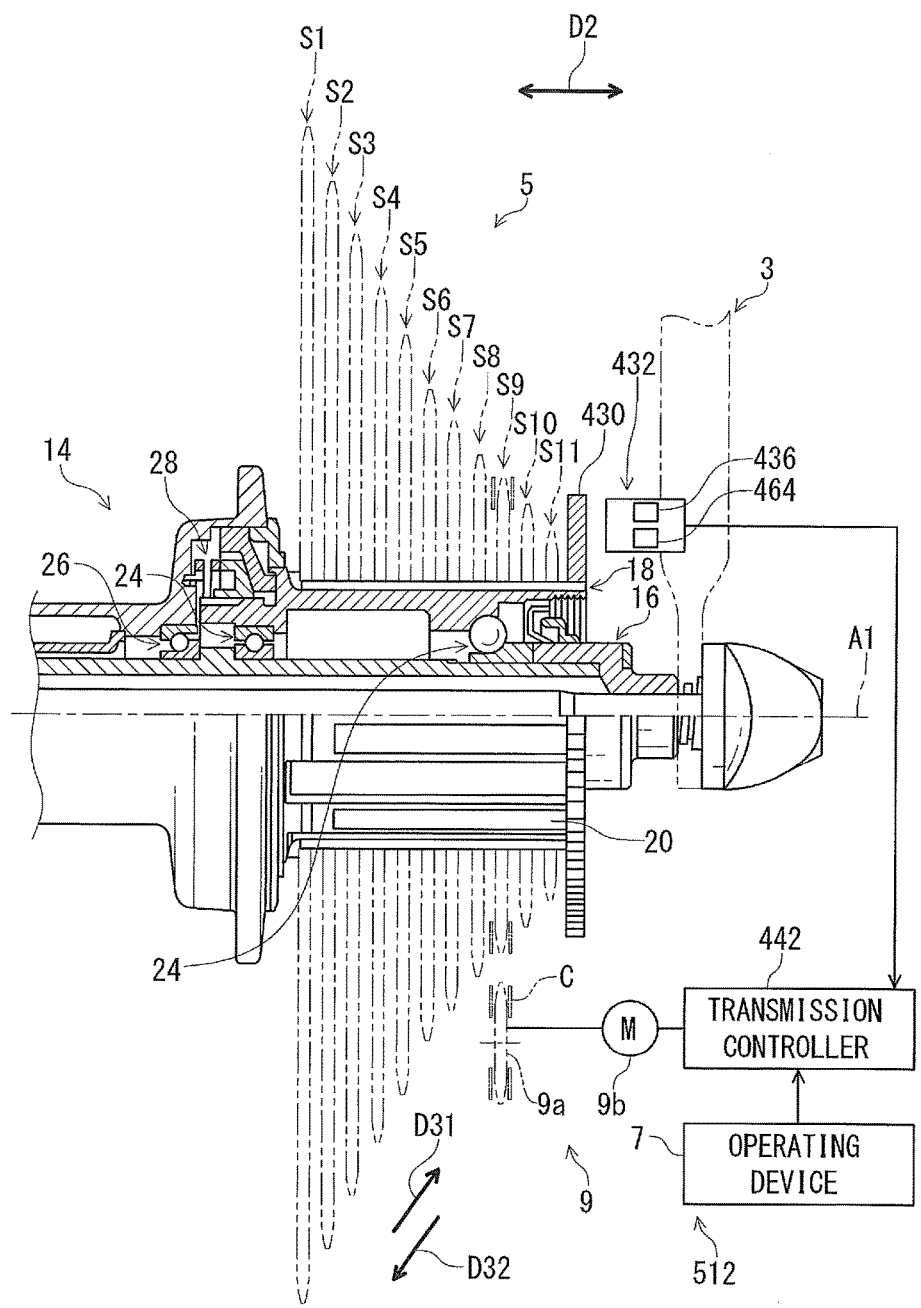
FIG. 28 is a partial half cross-sectional view of the bicycle hub assembly with a bicycle shifting control apparatus in accordance with a fifth embodiment.

As seen in FIG. 28, the bicycle shifting control apparatus 512 comprises the sensing target 430, the rotational-position sensing unit 432, and the transmission controller 442 in accordance with the fourth embodiment. Unlike the fourth embodiment, however, the sensing target 430 and the rotational-position sensing unit 432 are provided outside the housing member 18. The sensing target 430 is provided radially outward of the housing member 18 as well as the sensing target 30 in accordance with the first embodiment. The rotational-position sensing unit 432 is mounted to the bicycle frame 3 to face the sensing target 430 in the axial direction D2.

With the bicycle shifting control apparatus 512, it is possible to obtain substantially the same advantageous effect as that of the bicycle shifting control apparatus 12 in accordance with the first embodiment.

The arrangement of the sensing target and the rotational-position sensing unit is not limited to the above embodiments. For example, the sensing target can be provided on an axial side of the housing member 18 if needed and/or desired. In such an embodiment, for example, the rotational-position sensing unit can be mounted to the bicycle frame 3.

It will be apparent to those skilled in the bicycle field from the present disclosure that the above embodiments can be at least partially combined with each other. Furthermore, while the bicycle shifting control apparatus in accordance with each of the above embodiments is configured to control the rear derailleur 9, the configurations of the bicycle shifting control apparatus can be applied to a control apparatus configured to control the front derailleur 8 if needed and/or desired.

In the present application, the term "comprising" and its derivatives, as used herein, are intended to be open ended terms that specify the presence of the stated features, elements, components, groups, integers, and/or step ST, but do not exclude the presence of other unstated features, elements, components, groups, integers and/or step ST. This concept also applies to words of similar meaning, for example, the terms "have", "include" and their derivatives.

The terms "member", "section", "portion", "part" and "element" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle shifting control apparatus comprising:
a rotational-position sensing unit configured to sense a rotational position of a sprocket assembly configured to be rotatably supported by a housing member configured to be rotatable relative to an axle member, the rotational-position sensing unit being provided inside the housing member, the rotational-position sensing unit being provided outside a hub shell; and
a transmission controller configured to control a derailleur based on the rotational position sensed by the rotational-position sensing unit and calculate a shift timing at which a sprocket of the sprocket assembly is disposed at a predetermined rotational position based on the rotational position sensed by the rotational-position sensing unit.

2. The bicycle shifting control apparatus according to claim 1, further comprising:
a bicycle hub assembly including the axle member and the housing member, the housing member being configured to rotate with the sprocket assembly and provided radially outward of the axle member, wherein
the rotational position-sensing unit is provided between the axle member and the housing member.

3. The bicycle shifting control apparatus according to claim 2, further comprising:
a sensing target rotatable with the sprocket assembly and provided inside the housing member, wherein the rotational-position sensing unit is configured to contact the sensing target to sense a rotational position of the sensing target as the rotational position of the sprocket assembly.

4. The bicycle shifting control apparatus according to claim 3, wherein
the sensing target comprises an output gear rotatable with the sprocket assembly, and
the rotational-position sensing unit includes
a sensing gear configured to mesh with the output gear, and
a sensor configured to sense the rotational position of the sensing target based on a rotational position of the sensing gear.

5. The bicycle shifting control apparatus according to claim 1, further comprising:
a sensing target rotatable with the sprocket assembly and provided inside a bicycle hub assembly, wherein
the rotational-position sensing unit is configured to sense a rotational position of the sensing target as the rotational position of the sprocket assembly without contacting the sensing target.

6. The bicycle shifting control apparatus according to claim 5, further comprising:
the bicycle hub assembly including the axle member and the housing member, the housing member being configured to rotate with the sprocket assembly and provided radially outward of the axle member, wherein
the sensing target is mounted on an inner periphery of the housing member, and
the rotational-position sensing unit is mounted on an outer periphery of the axle member to face the sensing target.

7. A bicycle shifting control apparatus comprising:
a rotational-position sensing unit configured to sense a rotational position of a sprocket assembly configured to be rotatably supported by a housing member configured to be rotatable relative to an axle member, the rotational-position sensing unit being provided inside the housing member; and
a transmission controller configured to control a derailleur based on the rotational position sensed by the rotational-position sensing unit, wherein
the transmission controller is configured to store an operating time for which the derailleur shifts a bicycle chain between a sprocket and an additional sprocket of the sprocket assembly, the additional sprocket being adjacent to the sprocket without another sprocket between the sprocket and the additional sprocket, and
the transmission controller is configured to calculate a shift timing at which the sprocket or the additional sprocket is disposed at a predetermined rotational position at which the derailleur starts to shift the bicycle chain based on
the operating time stored in the transmission controller, and
a current rotational position sensed by the rotational-position sensing unit when an operation signal to actuate the derailleur is inputted from an operating device to the transmission controller.

8. The bicycle shifting control apparatus according to claim 7, wherein
the transmission controller is configured to control the derailleur to start to shift the bicycle chain at the shift timing.

9. The bicycle shifting control apparatus according to claim 2, wherein
the bicycle hub assembly includes the hub shell configured to be rotatably mounted on the axle member about a rotational center axis.

10. The bicycle shifting control apparatus according to claim 9, wherein
the bicycle hub assembly includes a ratchet structure configured to prevent the housing member from rotating relative to the hub shell in a rotational driving direction and configured to allow the housing member to rotate relative to the hub shell in a reverse direction opposite to the rotational driving direction.

11. The bicycle shifting control apparatus according to claim 10, wherein
the rotational-position sensing unit is farther from the hub shell than the ratchet structure in an axial direction parallel to the rotational center axis.

12. The bicycle shifting control apparatus according to claim 1, further comprising:
a sensing target configured to rotate with the sprocket assembly with respect to the rotational-position sensing unit and provided inside a bicycle hub assembly, wherein
the rotational-position sensing unit is configured to sense a rotational position of the sensing target as the rotational position of the sprocket assembly.

13. The bicycle shifting control apparatus according to claim 1, wherein
the transmission controller is configured to calculate a current rotational speed of the sprocket assembly based on a plurality of rotational positions sensed by the rotational-position sensing unit.

14. The bicycle shifting control apparatus according to claim 13, wherein
the transmission controller is configured to calculate the shift timing based on the rotational position sensed by the rotational-position sensing unit, the calculated speed of the sprocket assembly, and the predetermined rotational position.

15. The bicycle shifting control apparatus according to claim 7, wherein
the rotational-position sensing unit is provided outside a hub shell.

16. The bicycle shifting control apparatus according to claim 7, further comprising:
a sensing target configured to rotate with the sprocket assembly and with respect to the rotational-position sensing unit, the sensing target being provided inside a bicycle hub assembly, wherein
the rotational-position sensing unit is configured to sense a rotational position of the sensing target as the rotational position of the sprocket assembly.

17. The bicycle shifting control apparatus according to claim 7, wherein
the transmission controller is configured to calculate a current rotational speed of the sprocket assembly based on a plurality of rotational positions sensed by the rotational-position sensing unit.

18. The bicycle shifting control apparatus according to claim 17, the transmission controller is configured to calculate the shift timing based on the operating time, the current rotational position, the calculated speed of the sprocket assembly, and the predetermined rotational position.

* * * * *